(12) United States Patent
Gangirevula et al.

(10) Patent No.: US 11,978,191 B1
(45) Date of Patent: May 7, 2024

(54) SYSTEM AND METHOD OF DIGITALIZING A SLIDE

(71) Applicant: Pramana, Inc., Cambridge, MA (US)

(72) Inventors: Parveen Shaik Gangirevula, Bengaluru (IN); Shilpa G Krishna, Kerala (IN); Raghubansh Bahadur Gupta, Bangalore (IN); Durgaprasad Dodle, Telangana (IN); Pavani Pallavi Pelluru, Pocharam (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/382,769

(22) Filed: Oct. 23, 2023

(51) Int. Cl.
*G06T 7/00* (2017.01)

(52) U.S. Cl.
CPC .. *G06T 7/0004* (2013.01); *G06T 2207/20081* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 8,565,503 B2 | 10/2013 | Eichhorn | |
| 2008/0099661 A1* | 5/2008 | Virag | G02B 21/34 250/201.3 |
| 2019/0266726 A1* | 8/2019 | Madabhushi | G06T 7/0012 |
| 2020/0400930 A1* | 12/2020 | D'Costa | G16H 10/40 |
| 2022/0076411 A1 | 3/2022 | Georgescu | |
| 2022/0318979 A1* | 10/2022 | Chen | G06T 7/40 |
| 2022/0343499 A1* | 10/2022 | Yousfi | G16H 30/40 |
| 2023/0068571 A1* | 3/2023 | Linhart | G16H 30/40 |
| 2023/0221342 A1 | 7/2023 | Gebing | |

* cited by examiner

*Primary Examiner* — Bobbak Safaipour
(74) *Attorney, Agent, or Firm* — Caldwell Intellectual Property Law

(57) ABSTRACT

A system of digitalizing a slide, comprising at least one imaging device and a computing device communicatively connected to the imaging device, wherein the computing device is configured to scan each slide of a plurality of slides at the imaging device to generate an initial slide image and associated scanning metadata for each slide, determine a quality control metric for each slide as a function of the initial slide image and the associated scanning metadata, wherein determining the quality control metric includes flagging the slide based on the determined quality control metric, generate at least one scanning profile as a function of the scanning metadata based on the quality control metric, and re-scan the flagged slides at the imaging device using the at least one scanning profile.

20 Claims, 8 Drawing Sheets

Scanning, using at least one Imaging Device, each Slide of a Plurality Slides within at least one Slide Storage, to Generate an Initial Slide Image and Associated Scanning Metadata for each Slide of the Plurality of Slides — 705

Determining, by a Computing Device, a Quality Control Metric for each Slide of the Plurality of Slides as a Function of Initial Slide Image and Associated Scanning Metadata, wherein Determining the Quality Control Metric comprises Flagging the Slide based on the Quality Control Metric — 710

Generating, by the Computing Device, at least one Scanning Profile as a Function of the Scanning Metadata based on Quality Control Metric — 715

Re-scanning, by the Computing Device, at least one Scanning Profile as a Function of the Scanning Metadata Based on the Quality Control Metric — 720

SYSTEM AND METHOD OF DIGITALIZING A SLIDE

FIELD OF THE INVENTION

The present invention generally relates to the field of image generation. In particular, the present invention is directed to a system and method of digitalizing a slide and method of use.

BACKGROUND

Balancing the need to ensure coverage of required elements that get scanned with the time required to scan the glass slide can be challenging. An automated workflow that minimizes the likelihood of missing scanning required content present on the glass slide within a desired time frame is needed.

SUMMARY OF THE DISCLOSURE

In an aspect, a system of digitalizing a slide is described. The system includes at least one imaging device and a computing device communicatively connected to the imaging device, wherein the computing device is configured to scan each slide of a plurality of slides at the imaging device to generate an initial slide image and associated scanning metadata for each slide of the plurality of slides, determine a quality control metric for each slide of the plurality of slides as a function of the initial slide image and the associated scanning metadata, wherein determining the quality control metric includes flagging the slide based on the determined quality control metric. The computing device is further configured to generate at least one scanning profile as a function of the scanning metadata based on the quality control metric, and re-scan the flagged slides within the plurality of slides at the imaging device using the at least one scanning profile.

In another aspect, a method of digitalizing a slide is described. The method includes scanning, using at least one imaging device, each slide of a plurality of slides, to generate an initial slide image and associated scanning metadata for each slide of the plurality of slides, determining, by a computing device, a quality control metric for each slide of the plurality of slides as a function of the initial slide image and the associated scanning metadata, wherein determining the quality control metric includes flagging the slide based on the determined quality control metric. The method further includes generating, by the computing device, at least one scanning profile as a function of the scanning metadata based on the quality control metric and re-scanning, at the at least one imaging device, the flagged slides within the plurality of slides at the imaging device using the at least one scanning profile.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for digitalizing a slide, wherein the system includes at least one imaging device, at least one slide storage containing a plurality of slides, and a computing device communicatively connected to the imaging device, wherein the computing device is configured to scan each slide of the plurality of slides within the at least one slide storage at the imaging device to generate an initial slide image and associated scanning metadata for each slide of the plurality of slides, determine a quality control metric for each slide of the plurality of slides as a function of the initial slide image and the associated scanning metadata, wherein determining the quality control metric includes flagging the slide based on the determined quality control metric. The computing device is further configured to generate at least one scanning profile as a function of the scanning metadata based on the quality control metric and re-scan the flagged slides within the plurality of slides at the imaging device using the at least one scanning profile. Exemplary embodiments illustrating aspects of the present disclosure are described below in the context of several specific examples.

Figure 1:
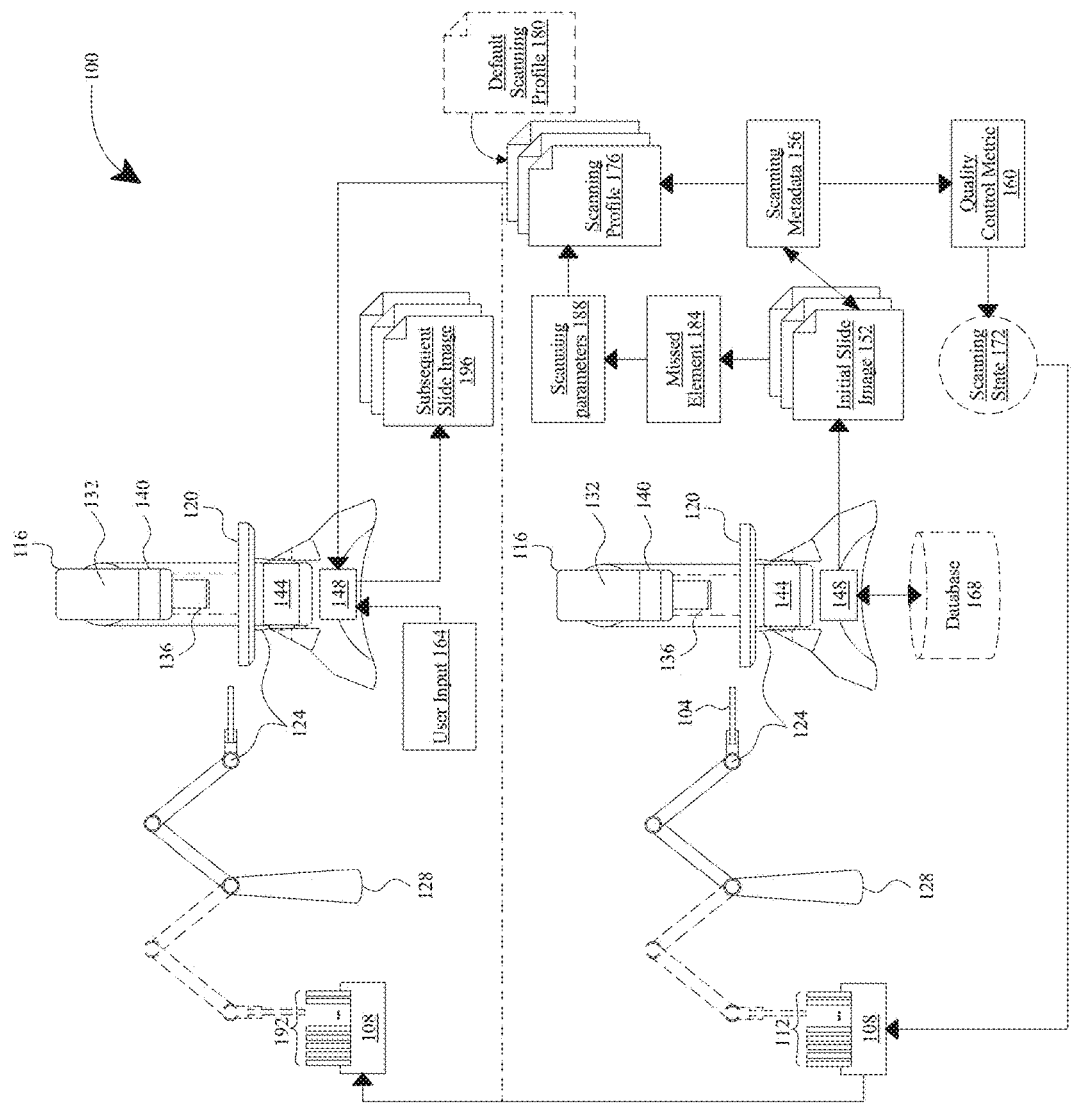
FIG. 1 is an exemplary embodiment of a system of digitalizing a slide.

Referring now to FIG. 1, an exemplary embodiment of a system 100 of digitalizing a slide 104 is illustrated. A "slide," for the purpose of this disclosure, is a container or surface for holding a specimen. In some cases, specimen may include, without limitation, tissue samples, cellular structures, or other biological materials. In some embodiments, slide 104 may include a formalin fixed paraffin embedded slide. In some embodiments, specimen on slide 104 may be stained. In some embodiments, slide 104 may be substantially transparent. In some embodiments, slide 104 may include a glass slide. In some embodiments, slide 104 may include a thin, flat, and substantially transparent glass slide. In some cases, a cover, such as a transparent cover, may be applied to slide 104 such that specimen is disposed between slide 104 and the cover. For example, and without limitation, specimen may be compressed between slide 104 and corresponding cover. In a non-limiting example, slide 104 may include a histopathology slide.

With continued reference to FIG. 1, system 100 may include at least one slide storage 108. As used in this disclosure, a "slide storage" refers to a specialized containment or housing system designed to securely hold, organized, and protect plurality of slides 112. In some cases, at least one slide storage 108 may be configured in a way that plurality of slides 112 thereof are kept free from dust, damage, and contamination. In some cases, at least one slide storage 108 may be designed for easy retrieval and placement of plurality of slides 112 for viewing or scanning purposes. In a non-limiting embodiment, at least one slide storage 108 may include a slide basket, wherein the slide basket may be a structured container, made of durable material such as plastic, stainless steel, or a combination thereof. In some cases, slide basket may be rectangular in shape. In some cases, casing of slide basket may resist to chemicals, heat, and other environmental factors that may be present during slide retravel, processing, or storing.

Still referring to FIG. 1, in some cases, at least one slide storage 108 such as a slide basket, may include one or more compartments or slots, each configured to hold a single slide 104. In some cases, one or more compartments may be configured to ensure that each slide of plurality of slides 112 may remain separated from each other, preventing scratches, overlaps, or any physical contact that may damage the slide surface or specimen mounted on it. Additionally, or alternatively, slide basket may include a handle e.g., an ergonomic handle, allowing user, actuator mechanism and/or transfer component as described in detail below to easily lift and transport between system components. In some cases, (entire) slide basket may be able to immerse into processing solutions or water baths. In some embodiments, slide basket may include foldable or detachable handle for compact storage. Further, slide basket may include ventilation, for example, and without limitation, one or more casings of slide basket may include open mesh or perforated patterns configured to facilitates quick drying of slides after washing or chemical treatment and ensure that no residues are trapped within the basket.

With continued reference to FIG. 1, In some embodiments, base of slide basket may be slightly elevated or feature small feet, e.g., the bottom of slide basket may not sit flush with surfaces. This may enable better air circulation and prevent any trapped moisture within at least one slide storage 108. In some embodiments, at least one slide storage 108 may also include a locking mechanism. In a non-limiting example, a lid having a latch, or a magnetic seal may be integrated, wherein the lid may securely fit over the top of slide basket, ensuring a tight closure. Additionally, or alternatively, lid may feature one or more transparent windows or a clear material, allowing for visual inspection of plurality of slides 112 without the need to open at least one slide storage 108. In this case, plurality of slides 112 stored within slide storage 108 may be held in place, preventing any lateral or vertical movement within the compartment. In some cases, capacity of at least one slide storage may vary; for instance, and without limitation, at least one slide storage may include a small slide basket designed to hold as few as 10 slides or a larger slide basket that may accommodate 50 or more slides.

Still referring to FIG. 1, additionally, or alternatively, at least one slide storage 108 e.g., slide basket may include a basket adapter, wherein the "basket adapter," for the purpose of this disclosure, is a device or component within slide basket configured to augment scanning process. In some cases, basket adapter may include one or more slots as described above that vertically support the weight and loading of plurality of slides 112. In some embodiments, basket adapter may be designed with a uniform tilt angle; for instance, and without limitation, an angle, in some cases, between 5° to 90°, may be applied to the base of slide basket. In some cases, tilt angle may be calibrated to ensure that it provides the necessary support to plurality of slides 112 up to a threshold where one or more slides of plurality of slides 112 are no longer confidently secured within slide basket, preventing any unintended dislodgment or misalignment during scanning process as described below. In some cases, such basket adapter may facilitate easier access for transfer component, wherein the transfer component may not have to make additional adjustments or movements to retrieve or place slide 104, as the tilt angle of basket adapter provides a natural guide.

Still referring to FIG. 1, further, slide basket may include a plurality of sensors, such as without limitation, pressure sensors, proximity sensors, and/or the like to detect internal conditions e.g., presence of plurality of slides 112. In a non-limiting example, each sensor of plurality of sensors may be disposed at bottom of each slot or compartment, in direct or indirect contact with or proximity to plurality of slides 112 stored within slide basket. In some cases, at least one slide storage 108 may be configured to communicate with other devices in system 100. For instance, and without limitation, feedbacks from plurality of sensors, e.g., whether a slot is occupied, may be relayed to imaging device or any computing devices as described in detail below, allowing for real-time monitoring of scanning process, thereby ensuring efficient slide retrieval and/or placement.

With continued reference to FIG. 1, system 100 includes at least one imaging device 116. As described in this disclosure, an "imaging device" is an apparatus configured to capture visual information in the form of images or sequences of images. In an embodiment, imaging device 116 may convert an optical image into an electronic signal, which can then be processed, stored, or displayed, as described in detail below. For example, and without limitation, imaging device as described herein, in some cases, may be used specialized for use in medical diagnostics under clinical setting, e.g., a microscope configured to capture detailed, high-resolution images of microscopic subjects to enable accurate diagnosis, disease monitoring, and any other biological research. In a non-limiting example, imaging device 116 may be consistent with any imaging device as described in U.S. patent application Ser. No. 18/226,058, filed on Jul. 25, 2023, and entitled "IMAGING DEVICE AND A METHOD FOR IMAGE GENERATION OF A SPECIMEN," the entirety of which is incorporated herein by reference.

With continued reference to FIG. 1, in an embodiment, imaging device 116 may include at least a stage 120 configured to receive and hold slide 104. As used in this disclosure, a "stage" is a flat platform (i.e., an even surface without significant bumps, depressions, or curvatures) on which slide 104 or specimen is placed for examination. In some cases, stage may include a slide port having one or more alignment features, wherein the "alignment features" are physical features that help to secure received slide 104 in place and/or align a slide with another component of imaging device 116 as described herein. In some embodiments, alignment features may include a component which keeps slide 104 secure, such as a clamp, latch, clip, recessed area, or another fastener. In some embodiments, stage 120 may allow for easy removal or insertion of slide 104. In some embodiments, stage 120 may include a transparent surface through which light may travel. In some embodiments, slide 104 may rest on and/or may be illuminated by light traveling through such a transparent surface of stage 120. In some embodiments, stage 120 may be mechanically connected to an actuator mechanism 124 as described below.

Still referring to FIG. 1, in some cases, imaging device 116 may include an actuator mechanism 124. As used herein, an "actuator mechanism" is a mechanical component configured to change the position of a slide relative to an optical system. In a non-limiting example, actuator mechanism 124 may be configured to precisely move stage 120 in the X, Y, and/or even Z directions, allowing for detailed examination of different part of the specimen. In one or more embodiments, actuator mechanism 124 may be used to alter line of sight so that an image of slide 104 may be captured, as discussed further in this disclosure. In some embodiments, actuator mechanism 124 may be mechanically connected to slide 104, such as slide 116 in slide port. In some embodiments, actuator mechanism 124 may be mechanically connected to slide port. For example, actuator mechanism 124 may move slide port in order to move slide 104. For example, and without limitation, actuator mechanism 124 may move slide port so that a distance D between a top surface of slide 104 and an optical component as described below varies.

With continued reference to FIG. 1, in some embodiments, actuator mechanism 124 may also vary an angle between top surface (e.g., surface directed toward, or facing, optical system and that the slide 104 and/or specimen contacts) and ground. In some embodiments, actuator mechanism 124 may be mechanically connected to a mobile element (i.e., any movable or portable object, component, and device) within imaging device 100 such as, without limitation, slide 116, slide port, stage 120, or an optical system as described in detail below. In some embodiments, actuator mechanism 124 may be configured to change the relative position of slide 104 and optical system by moving stage 120, slide 104, and/or optical system in X, Y, and/or Z directions during slide scanning and/or re-scanning process as described in detail below.

Still referring to FIG. 1, in some embodiments, actuator mechanism 124 may include a hydraulic actuator. A hydraulic actuator may consist of a cylinder or fluid motor that uses hydraulic power to facilitate mechanical operation. Output of hydraulic actuator mechanism 124 may include mechanical motion, such as without limitation linear, rotatory, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. "Single acting" may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. "Double acting" may be used when pressure is applied substantially on each side of a piston; any difference in resultant force between the two sides of the piston causes the piston to move.

Still referring to FIG. 1, in some embodiments, actuator mechanism 124 may include a pneumatic actuator mechanism. In some cases, a pneumatic actuator may enable considerable forces to be produced from relatively small changes in gas pressure. In some cases, a pneumatic actuator may respond more quickly than other types of actuators such as, for example, hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator mechanism 124 may include an electric actuator. Electric actuator mechanism 124 may include any of electromechanical actuators, linear motors, and the like. In some cases, actuator mechanism 124 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism 124 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator mechanism 124 may include a mechanical actuator mechanism 124. In some cases, a mechanical actuator mechanism 124 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

With continued reference to FIG. 1, in some cases, system 100 may include a transfer component 128, wherein the "transfer component," as described herein according to some embodiments, refers to a device or system configured to move, transfer, or position objects e.g., slide 104 or any slide of plurality of slides 112 within at least one slide storage component 108 as described above, from one location to another. In some cases, transfer component 128 may be positioned between at least one storage component 108 and imaging device 116 or any other processing unit, configured to automate the process of retrieving, positioning, and/or returning slides, ensuring that each slide of plurality of slides 112 may be moved efficiently between at least one slide storage 108 and imaging device 116.

Still referring to FIG. 1, in a non-limiting example, transfer component 128 may include programmable robotic arm that is configured to pick up, move, and place slide 104.

In some cases, transfer component 128 may include one or more joints, wherein each joint may allow at least a section of transfer component to move in a pre-defined range in X, Y, and/or Z directions. Transfer component 128 may include a gripping component located, in some cases, at the distal end of transfer component 128, wherein the gripping component may be configured to securely hold and release one or more slides. Such gripping component may be made of soft, non-abrasive materials to ensure no damage to held slides during slide transferring. In some cases, transfer component 128 may employ a pinch or suction mechanism to pick up and release slide. In other cases, transfer component 128 may be integrating into actuator mechanism 124 as described above, for instance, and without limitation, having a mechanism that converts rotary motion into linear motion, wherein the linear motion may then be harnessed to move or position one or more slides on stage 120 of imaging device 116 with precision. In a non-limiting example, such mechanism may include any mechanism that converts rotary motion into linear motion as described in U.S. patent application Ser. No. 18/382,386, filed on Oct. 20, 2023, and entitled "APPARATUS AND METHOD OF USE OF A MECHANISM THAT CONVERTS ROTARY MOTION INTO LINEAR MOTION," which its entirety is incorporated herein by reference.

With continued reference to FIG. 1, transfer component 128 may be equipped with one or more sensors as described herein such as, without limitation, proximity sensor and force sensors, configured to detect the exact position of the slides being transferred, ensuring that they are accurately placed for imaging or storage. In some cases, such information may be received from other devices within system 100, for example, transfer component 128 may be in communication with imaging device 116, wherein one or more sensors integrated into imaging device 116 e.g., one or more pressure sensors may be configured to detect a positioning of slide 104. Imaging device 116 may signal transfer component 128 upon a successful slide positioning (i.e., slide being correctly placed on stage 120 within alignment features).

Still referring to FIG. 1, in some cases, transfer component 128 and/or actuator mechanism 124 may include one or more dampening components to minimize vibrations or shocks during slides transfer. Dampening components may be configured to ensure that slides being transferred remain undamaged and in intended position at the end of the process. One or more computing device as described in detail below may be configured to control transfer component 128 as well as actuator mechanism 124 as described herein to follow a pre-defined path for slide transferring between at least one slide storage 108 and imaging device 116. Additionally, or alternatively, safety features e.g., collision detection may be implemented for transferring component 128 to stop or retract if an obstacle is detected. Other exemplary embodiments of transfer mechanism as described herein may include, without limitation, conveyor belt system, linear actuator, rotary table (i.e., a rotating platform/stage that hold multiple slides), among others.

With continued reference to FIG. 1, in some embodiments, imaging device 116 may include an optical system 132. As used in this disclosure, an "optical system" is an arrangement of one or more components which together act upon or employ electromagnetic radiation, such as light (e.g., visible light, infrared light, UV light, or the like). Optical system 132 may include one or more optical components 136, wherein each "optical component," as described herein, refers to any device or part of a device that manipulates, interacts with, or is affected by light. In a non-limiting example, optical components 136 may include lenses, mirrors, windows, filters, and the like. In some cases, optical system 132 may form an optical image that corresponds to an optical object. For instance, and without limitation, optical system 132 may form an optical image at or upon an optical sensor 140, which can capture, e.g., digitize, the optical image as described in detail below. In some cases, optical system 132 may have at least a magnification. For instance, and without limitation, optical system 132 may include an objective (e.g., microscope objective) and one or more reimaging optical elements that together produce an optical magnification as described in detail below. In some cases, a degree of optical magnification may be referred to herein as zoom.

Still referring to FIG. 1, in some cases, optical system 132 a light source 144. As used in this disclosure, a "light source" is any device configured to emit electromagnetic radiation. In some embodiments, light source may emit a light having substantially one wavelength. In some embodiments, light source 144 may emit light having a wavelength range. Light emitted by light source 144 as described herein may include, without limitation, ultraviolet light, visible light, and/or infrared light. In non-limiting examples, light source 144 may include a light-emitting diode (LED), an organic LED (OLED) and/or any other light emitter. Such light source may be configured to illuminate slide 104 and/or specimen on slide port and/or stage 120. In a non-limiting example, light source 144 may illuminate slide 104 and/or specimen on slide port and/or stage 120 from below as illustrated in FIG. 1. In another non-limiting example, light source 144 may illuminate slide 104 and/or specimen from above.

With continued reference to FIG. 1, In some cases, light source 144 may be connected to one or more optical components 136 as described herein such as, without limitation, a condenser lens (i.e., an optical component used to focus and condense light emitted by light source 144 onto slide 104 and/or specimen). In some cases, condenser lens may be configured to focus and uniformly distribute light so that slide 104 and/or specimen is evenly illuminated, thereby enhancing the resolution and contrast of the image. In a non-limiting example, optical component 136 such as condenser lens may gather and focus light emitted from light source 144 into a cone of light that illuminate slide 104 and/or specimen with uniform intensity over the entire viewable area. In some cases, condenser lens may include an aperture diaphragm, e.g., a variable opening that may be adjusted to control the amount of light reaching slide 104 and/or specimen. In some cases, adjusting such diaphragm may influence the contrast and depth of field in the image.

With continued reference to FIG. 1, in some cases, optical component 136 may also include an objective lens. As used int his disclosure, an "objective lens" is an optical component that gathers light from slide 104 and/or specimen and focuses it to produce optical image inside imaging device 116. In some embodiments, produced optical image may be magnified by eyepiece lens for viewing by a human operator or captured by optical sensor 140 as described in detail below for slide scanning and/or digital imaging. In some embodiments, optical system 132 may include three objective lenses, wherein each objective lens may include various magnifications, ranging from 4× to 100× or even beyond. In some cases, magnification may be inscribed on the optical component casing. In some embodiments, optical components 136 may include different numerical apertures (NA) that measure lens's ability to gather light and resolve slide 104 and/or specimen detail at a fixed object distance. For example, and without limitation, a higher NA may indicate better resolving power. Exemplary types of objective lens may include, without limitation, dry objectives, immersion objectives, water immersion objectives, and/or the like.

Still referring to FIG. 1, in some embodiments, one or more optical components 136 within optical system 132 may be mounted on a nosepiece of imaging device 116. As used in this disclosure, a "nosepiece" is a part of imaging device 116, as shown in FIG. 1, that holds multiple optical components e.g., a plurality of objective lenses. In some cases, nosepiece may include a revolving nosepiece (also known as a turret), wherein the revolving nosepiece may include a rotatable component located head portion of imaging device 116 and configured to hold multiple objective lenses. Optical components 136 may be quickly and efficiently switched from one another using the revolving nosepiece during imaging of plurality of slides 112. In some embodiments, optical system 132 may be parfocal; for instance, and without limitation, when a first objective lens is in focus, switching to a second objective lens or a third objective lens may require minimal refocusing. In some cases, plurality of optical components 136 may be spaced out at a consistent distance on the revolving nosepiece and each optical component may be at a consistent distance from stage 120.

It should be noted that the number of optical components 136 within optical system 132 as described above is illustrative and should not be restrictive. The actual number of optical components may vary, and optical system 132 may incorporate more or fewer optical components as needed. As an ordinary person skilled in the art, upon reviewing the entirety of this disclosure, will be aware of various modifications, adaptations, and alternative configurations that can be applied to optical system 132 and optical components 136 as described herein.

With continued reference to FIG. 1, as used herein, an "optical sensor" is a device that measures light and converts the measured light into one or more signals; one or more signals may include, without limitation, one or more electrical signals. In some embodiments, optical sensor 140 may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, optical sensor may include a plurality of photodetectors. Optical sensor 140 may include, without limitation, a camera. Optical sensor may be in electronic communication with a computing device 148 as described in detail below. As used herein, "electronic communication" as used in this disclosure is a shared data connection between two or more devices. In some embodiments, optical system 132 may include two or more optical sensors. In some cases, optical sensor 140 may be disposed adjacent to optical components 136. In a non-limiting example, optical sensor 140 may be mounted on nosepiece as described above. In another non-limiting example, optical sensor 140 may be installed inside the head portion of imaging device 116, above optical components 136.

Still referring to FIG. 1, in some embodiments, at least one optical sensor 140 may include a camera. In some cases, a camera may include one or more optics as described herein such as, without limitation, spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of specimen on slide 104. In some embodiments, one or more of such settings may be configured based on a parameter set (i.e., a set of values, such as without limitation, quantitative and/or numerical values that identify how image is to be captured), such as any parameter set as disclosed in U.S. patent application Ser. No. 18/226,058. In some embodiments, camera may capture images at a low depth of field.

With continued reference to FIG. 1, system 100 includes a computing device 148. In one or more embodiments, system 100 and/or computing device 148 may include an application-specific integrated circuit (ASIC) communicatively connected to a memory. Memory may include reaonly memory (ROM) and/or rewritable ROM, FPGA, or other combinational and/or sequential synchronous or non-synchronous digital circuitry to store parameters described further in this disclosure. In one or more embodiments, memory may include one or more memory devices to store data and information, such as parameters or metrics as described herein. The one or more memory devices may include various types of memory including, but not limited to, volatile and non-volatile memory devices, such as, for example, ROM (Read-Only Memory), EEPROM (Electrically-Erasable Read-Only Memory), RAM (Random Access Memory), flash memory, and the like.

Still referring to FIG. 1, in one or more embodiments, computing device 148 may include a processor adapted to execute software stored in memory to perform various methods, processes, and modes of operations in manner as described in this disclosure. In other embodiments, system 100 may include circuitry; for instance, and without limitation, system 100 may include programming in software and/or hardware circuit design. Computing device 148 may include or be included in any computing device as described in this disclosure, including without limitation a microcontroller, microprocessor, digital signal processor (DSP) and/or system on a chip (SoC) as described in this disclosure. Computing device 148 may include, be included in, and/or communicate with a mobile device such as a mobile telephone or smartphone. Computing device 148 may include a single computing device operating independently, or may include two or more computing device operating in concert, in parallel, sequentially or the like; two or more computing devices may be included together in a single computing device or in two or more computing devices.

Still referring to FIG. 1, computing device 148 may interface or communicate with one or more additional devices as described below in further detail via a network interface device. Network interface device may be utilized for connecting processor to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

With continued reference to FIG. 1, computing device 148 may include but is not limited to, for example, a computing device or cluster of computing devices in a first location and a second computing device or cluster of computing devices in a second location. computing device 148 may include one or more computing devices dedicated to data storage, security, distribution of traffic for load balancing, and the like. computing device 148 may distribute one or more computing tasks as described below across a plurality of processors of computing devices, which may operate in parallel, in series, redundantly, or in any other manner used for distribution of tasks or memory between computing devices. computing device 148 may be implemented using a "shared nothing" architecture in which data is cached at the worker, in an embodiment, this may enable scalability of system 100 and/or computing device 148.

With continued reference to FIG. 1, computing device 148 may be designed and/or configured to perform any method, method step, or sequence of method steps in any embodiment described in this disclosure, in any order and with any degree of repetition. For instance, computing device 148 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 148 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, as used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, imaging device, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In one or more embodiments, image data of slide image may be transmitted through one or more signals. In other embodiments, instructions from a human operator of imaging device 116 may send commands to a component of imaging device 116, such as optical system 128 and plurality of optical components 132a-d, through one or more signals. In some cases, a signal may be used to communicate with computing device 148, for example, by way of one or more ports. In some cases, a signal may be transmitted and/or received by computing device 148, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between imaging device 116 and computing device 148. In some cases, a digital signal containing image data of captured slide image may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE [printer port]), and the like.

Still referring to FIG. 1, in some embodiments, computing device 148 may perform one or more signal processing steps on a signal. For instance, computing device 148 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers.

Still referring to FIG. 1, in some embodiments, digital signal processing may be used by computing device 148 to process digitized discrete-time sampled signals. Commonly, digital signal processing may be performed by computing device 148 or other specialized digital circuits, such as without limitation an ASIC, a FPGA, or a DSP. Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, computing device 148 is configured to scan each slide of plurality of slides 112 using imaging device 116 as described above to generate an initial slide image 152. In some cases, optical sensor 140 may be utilized for such purposes. As used in this disclosure, a "slide image" refers to a digital representation or photograph of the contents of slide 104 e.g., contained specimen. In an embodiment, when slide is placed on slide port and/or stage 120, a view may be generated by optical system 132 using one or more optical components 136 and captured by optical sensor 140 such as a camera or any other imaging system within imaging device 116. Digital image (i.e., slide image) of such view may represent visual content of slide 104 at a specific magnification and resolution. In some cases, slide image may include a whole slide image (WSI) of slide 104. In other cases, slide image may include only a section of the WSI.

Still referring to FIG. 1, in one or more embodiments, slide image may include image data, wherein the "image data," as used herein, refers to information representing at least a physical scene, space, and/or object. Image data may include, for example, information representing a specimen, slide 104, or even a region of the specimen or slide 104. In some cases, image data may be generated by camera such as any camera as described herein. "Image data" may be used interchangeably through this disclosure with "image," where image is used as a noun. In some cases, digital image may be represented as a bitmap. In other cases, slide image may be comprised of any media capable of representing a physical scene, space, and/or object. Alternatively, where "image" is used as a verb, in this disclosure, it refers to generation and/or formation of an image.

Still referring to FIG. 1, in some embodiments, slide image may include one or more digital files in format such as, without limitation, JPEG, TIFF, PNG, or any other specialized digital formats. In some embodiments, slide image may be captured at a specific magnification level. In some embodiments, slide image may include annotations, such as, without limitation, one or more markers, labels, or notes to highlight specific area of interest or features. In some embodiments, slide image may also include metadata. In some cases, metadata may include, without limitation, information related to the magnification level of one or more optical components, imaging data (e.g., image resolution, image color model, set of parameters, etc.), specimen details (e.g., patient information), and other relevant data.

With continued reference to FIG. 1, in some embodiments, imaging device 116 may be configured to generate initial slide image 152 of slide 104 as a Z-stack, i.e., a series of slide images captured at different focal planes along the Z-axis (vertical axis) of specimen on slide 104. A z-range, the top and bottom focal planes or interest in specimen, may be identified, and an interval or a step size between each slide image in Z-stack may be determined. In some cases, z-range and step size may be manually entered by a human operator or be provided by parameter set as described above. In other cases, z-range and step size may be determined by computing device 148 as described in detail below. In some cases, smaller step sizes may provide more detailed 3D reconstructions but result in more slide images at the area of interest. Imaging device 116 may be configured to capture a slide image at each focal plane in between z-range and compiled into a single slide image containing a 3D reconstruction of specimen.

Still referring to FIG. 1, in a non-limiting example, initial slide image 152 may include an "integrated image," which is, for the purpose of this disclosure, a processed multi-layer scan composed of a plurality of slide images taken at various focus depths as described above. In one or more embodiments, initial slide image 152 may include a multi-layer scan having a plurality of overlayed slide images. For instance, and without limitation, plurality of slide images captured at a location x may be consolidated to create a first section of initial slide image 152. In one or more embodiments, integrated image may include an extended field of depth (EFOD) image. In some cases, initial slide image 152 may be captured by imaging device 116 using specimen image generation method as described in U.S. patent application Ser. No. 18/226,058. In some embodiments, at least one optical sensor 140 may include an image sensor. Exemplary non-limiting image sensors include digital image sensors, such as without limitation charge-coupled device (CCD) sensors and complimentary metal-oxide-semiconductor (CMOS) sensors. In some embodiments, optical sensor 140 may be sensitive within a non-visible range of electromagnetic radiation, such as without limitation infrared.

Still referring to FIG. 1, in a non-limiting example, along with initial slide image 152, metadata such as, a plurality of scanning metadata 156 associated with initial slide image 152 is also being generated by computing device 148. As used in this disclosure, "scanning metadata" refers to supplementary information generated or recorded during scanning process of each slide of plurality of slides 112 as described above. In some embodiments, scanning metadata 156 may provide context, details, and parameters related to the scanning process and the scanned slide. In some cases, scanning metadata 156 associated with initial slide image 152 may include one or more timestamps (e.g., exact date and time when the slide was scanned). In a non-limiting example, plurality of slides 112 may be stored in a chronological order within at least one slide storage 108 after scanned. In some cases, scanning metadata 156 may include a string describing a scanner identification (ID); for instance, and without limitation, details about imaging device used, including model, manufacturer, and/or any unique identification number may be encoded and incorporated into scanning metadata 156.

Still referring to FIG. 1, in some cases, scanning metadata 156 associated with initial slide image 152 may include data such as image resolution (i.e., pixel density of slide image, measured in dots per inch [DPI]). Image resolution may indicate a level of detail captured in the associated slide image. In some cases, scanning metadata 156 may include a bit depth (i.e., number of bits of information stored for each pixel), for example, and without limitation, a range of colors or shades of gray that can be represented may be determined by computing device 148 as a function of bit depth. Additionally, or additionally, in some cases, scanning metadata may include color profile (i.e., used color space) such as, without limitation, sRGB, RGB, RYB, CMY, CMYK, HSL, HSV or the like.

With continued reference to FIG. 1, scanning metadata 156 associated with initial slide image 152 may include data related to compression details e.g., details about compression algorithm, compression ratio, and/or the like. In some cases, computing device 148 may be configured to compress generated slide image during scanning each slide of plurality of slides 112. In an embodiment, computing device 148 may encode initial slide image 152 to reduce the file size and storage requirements while maintaining the essential visual information needed for further processing steps as described below. In an embodiment, compression and/or encoding of slide images may facilitate faster transmission of images. In some cases, computing device 148 may implement one or more lossless compression algorithms (i.e., maintain the original image quality of slide image), e.g., Huffman coding, Lempel-Ziv-Welch (LZW), Run-Length Encoding (RLE), and/or the like to identify and remove redundancy in each slide image without losing any information. In an embodiment, compressing and/or encoding each slide image may include converting the file format of each slide image into PNG, GIF, lossless JPEG2000 or the like. In other cases, one or more lossy compression algorithms such as, without limitation, Discrete Cosine Transform (DCT) in JPEG or Wavelet Transform in JPEG2000, may be implemented by computing device 148 to compress and/or encoding each slide image with a higher compression ratio but a reduced image quality (i.e., discard some less significant information within each slide image, resulting in a smaller file size).

Still referring to FIG. 1, in some cases, scanning metadata 156 associated with initial slide image 152 may include value representing a scan mode e.g., grayscale, color, or any other mode. In some cases, scanning metadata 156 may also include image settings, for example, exposure settings containing details about light exposure during the scanning process, which can affect the brightness and contrast of the generated initial slide image 152. In some cases, scanning metadata 156 may include imaging device settings. In an embodiment, scanning metadata 156 may include one or more focus parameters. In a non-limiting example, information about focus setting may include focus depth, Z-stack information, focus offset, lens specification, correction data, and/or the like. In another embodiment, scanning metadata 156 may include magnification level e.g., level of magnification used during scanning. In a further embodiment, if applicable, scan duration i.e., time taken to complete slide 104 or previous slide may be determined and/or recorded. Scanning metadata 156 including scan duration may be indicative or selected imaging device's depth or quality.

With continued reference to FIG. 1, in some embodiments, scanning metadata 156 associated with initial slide image 152 may include post-processing information. In a non-limiting example, any modifications or enhancements made to slide image after its being generated, such as brightness adjustments, contrast enhancements, or noise reduction. In some cases, scanning metadata may include slide label or slide identifier, for example, a unique identifier or label associated with slide 104 being scanned, may be incorporated into scanning metadata 156 aiding in cataloging and retrieval as described herein. Additionally, or alternatively, operator details such as, without limitation, information related to human operator or system administrator responsible for any processing steps as described herein may be included in scanning metadata 156 for accountability and quality control. In some cases, scanning metadata 156 may include calibration data i.e., information about any calibration performed on imaging device prior to the slide scanning. In other cases, scanning metadata 156 may further include environmental condition data (i.e., details about surrounding environment during scanning); for instance, and without limitation, temperature level, humidity level, and/or the like.

Still referring to FIG. 1, in a further embodiment, scanning metadata 156 associated with initial slide image 152 may include error logs. In some cases, scanning metadata 156 may include any errors or issues encountered during the scanning process, along with potential resolutions or nots. In a non-limiting example, scanning metadata 156 may include a contaminant presence indicator, wherein the "contaminant presence indicator," as described herein, is a metric, signal, or a set of data points derived from generated initial slide image that suggests or confirms a presence of contamination caused by one or more contaminants (in optical path of imaging device 116). In some cases, contaminants (i.e., any unwanted or foreign substance, particles, or materials that potentially interfere with the clarity, quality, or accuracy of initial slide image 152) may include, without limitation, dust from environment, residues from cleaning solutions, oils from human contact, or even specimens such as cells or tissues that inadvertently get onto slide 104, stage 120, or any optical components 136 of imaging device's 116 optical system 132.

Still referring to FIG. 1, in a non-limiting example, contaminant presence indicator may include a binary output e.g., "TURE/POS (i.e., positive)" as "contaminant present" or "FALSE/NEG (i.e., negative)" as "contaminant is not present." In some cases, scanning metadata 156 may include contaminant presence indicator and/or a contaminant cleaning protocol (i.e., a pre-defined set of procedures or actions designed to clean, remove, or mitigate the effects of contaminants as described above), wherein the contaminant presence indicator and the contaminant cleaning protocol may be consistent with ay contaminant presence indicator and contaminant cleaning protocol as described in U.S. patent application Ser. No. 18/382,345, filed on Oct. 20, 2023, and entitled "SYSTEM AND METHODS FOR DETECTING AND CLEANING CONTAMINANTS FROM AN IMAGING OPTICAL PATH," its entirety of which is incorporated herein by reference.

With continued reference to FIG. 1, computing device 148 is configured to determine a quality control metric 160 for each slide of plurality of slides 112 as a function of initial slide image 148 and associated scanning metadata 156. As used in this disclosure, a "quality control metric" refers to a standardized measure or set of measures used to evaluate and ensure the quality of generated slide image. In an embodiment, quality control metric 160 may include an assessment of initial slide image's 152 clarity, accuracy, and overall quality. As a person skilled in the art, upon reviewing the entirety of this disclosure, will recognize importance of ensuring digitalized slides that are of highest possible quality suitable for research, diagnosis, archival, or any other intended purposes. In a non-limiting example, quality control metric 160 may be used to determine whether the initial slide image 152 meets predefined standards and if any corrective actions or adjustments are needed as described in detail below.

Still referring to FIG. 1, in some cases, quality control metric 160 may include a numeric value representing an overall score of initial slide image 152. The overall score may be derived from various individual metrics such as, without limitation, sharpness, contrast ratio, noise level, color accuracy, and/or the like as described below. In some cases, such numeric value may be compared against a threshold value to decide if initial slide image 152 meets the desired quality standard. In other cases, quality control metric 160 may include categorical evaluations, such as "Excellent," "Good," "Fair," or "Poor," based on a combination of individual metrics, determined based on initial slide image 152 and assigned to corresponding slide 104.

With continued reference to FIG. 1, in some embodiments, quality control metric 160 may be determined, by computing device 148, based on image sharpness of initial slide image 152, wherein the image sharpness measures the clarity and crispness of initial slide image 152. In a non-limiting example, a higher sharpness value of initial slide image 152 may indicate a clearer image with well-defined details, leading to a high score. In some embodiments, quality control metric 160 may be determined as a function of contrast ratio of initial slide image 152. In some cases, contrast ratio (e.g., contrast-to-noise ratio [CNR] or signal-to-noise [SNR]) may evaluate a difference in luminance or color between a lightest and a darkest area of initial slide image 152. In some embodiments, quality control metric 160 may be determined based on color accuracy of initial slide image 152 i.e., an assessment of how accurately initial slide image 152 reproduces colors of original slide 104. Other exemplary embodiments of slide image metric may include, without limitation, slide image resolution, image noise level, brightness/color uniformity, dynamic range, and/or the like.

Still referring to FIG. 1, in some cases, quality control metric 160 of each slide of plurality of slides 112 may be also determined based on (imaging device 116) focus quality. In some cases, scanning metadata 156 associated with initial slide image 152 may provide one or more data points related to focus quality. In some embodiments, quality control metric 160 may be determined based on depth of field (DoF). In a non-limiting example, a larger DoF may indicate more of specimen is in focus simultaneously. In some cases, determining quality control metric 160 may include generating a depth map (i.e., an image or image channel that contains information related to the distance of the surfaces to scene object e.g., specimen contained in slide 104 from a viewpoint). In some embodiments, information related to chromatic aberration, when different wavelengths of light emitted by light source 144 are focused on slightly different positions, may be used to determine quality control metric 160 as described herein. In a non-limiting example, quality control metric 160 may include a higher score when chromatic aberration is minimized (i.e., minimal color fringing). In other embodiments, quality control metric 160 may be determined based on a planarity score, wherein the "planarity score," for the purpose of this disclosure, refers to a value or metric that quantifies a flatness or evenness of a surface e.g., slide's 104 surface, stage 120 surface, slide port surface, and/or the like derived from initial slide image 152. In a non-limiting example, planarity score and methods for calculating planarity score may be described in U.S. patent application Ser. No. 18/382,345 as described above. Ideally, entire field of view should be in focus; however, sometimes center of initial slide image 152 may be in focus while edges may be blurry, or vice versa. In some cases, quality control metric 160 may include a higher score when initial slide image 152 has a uniform focus across the field of view.

Still referring to FIG. 1, in an embodiment, quality control metric 160 may be determined based on a degree of quality of depiction of a region of interest of initial slide image 152. In some cases, region of interest may include a region of slide image containing most detail about the specimen. Computing device 148 may determine a degree of blurriness of images using one or more image processing techniques as described herein. In a non-limiting example, computing device 148 may perform a blur detection by taking a Fourier transform, or an approximation such as a Fast Fourier Transform (FFT) of images and analyzing a distribution of low and high frequencies in the resulting frequency-domain depiction of a plurality of slide images. Numbers of high-frequency values below a threshold level may indicate blurriness. In another non-limiting example, detection of blurriness may be performed by convolving slide images, a channel of slide images, or the like with a Laplacian kernel; for instance, and without limitation, computing device 148 may generate a numerical score (i.e., quality control metric 160) reflecting a number of rapid changes in intensity shown in each slide image, such that a high score indicates clarity, and a low score indicates blurriness. In some cases, blurriness detection may be performed using a Gradient-based operator, which measures operators based on the gradient or first derivative of images, based on the hypothesis that rapid changes indicate sharp edges in initial slide image 152, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, computing device 148 may be configured to rank plurality of slide images for plurality of slides 112 according to degree of quality of depiction.

Still referring to FIG. 1, additionally, or alternatively, quality control metric 160 may be determined based on artifacts detection, for example, and without limitation, computing device 148 may be configured to analyze initial slide image 152 for anomalies, inconsistencies, or patterns that are not expected to be part of actual specimen or slide 104. The quantity of contaminants e.g., unwanted particles may be used to calculate the score. In some cases, scratches to the slide and/or examination surfaces may also be detected by computing device 148 and used for determination of quality control metric 160. Advanced image analysis algorithms, such as, without limitation, morphological operations (such as dilation, erosion, opening, or closing), Fourier Transform, scale invariant feature transform (SIFT), image segmentation, edge detection (such as Sobel, Canny, or Prewitt operators), among others may be used for artifacts detection as described herein. In some cases, one or more machine learning processes, as described in further detail below may be incorporated into the analyzing process of initial slide image 152, for example, and without limitation, convolutional neural networks (CNN), support vector machines (SVM), random forests, and/or the like may be implemented, by computing device 148, for determining quality control metric 160 for each slide of plurality of slides 112. In a non-limiting example, determining quality control metric 160 may include determining quality control metric as a function of contaminant presence indicator as described in U.S. patent application Ser. No. 18/382,345.

With continued reference to FIG. 1, determining quality control metric 160 may include combining individual metrics and/or scores as described above into a single composite score. In some cases, single composite score may be generated using a weighted average, wherein a plurality of weights may be determined, by computing device 148 by an importance of each metric. In some cases, plurality of weights may be pre-determined, for example, by a human operator manually.

Still referring to FIG. 1, additionally, or alternatively, determining quality control metric 160 may include validating the scanning metadata 156 associated with initial slide image 152. Scanning metadata 156 such as, without limitation, magnification level, illumination settings, focus parameters, scan timestamps may be validated to ensure that each slide of plurality of slides 112 is scanned and slide image is generated as intended. In a non-limiting example, light intensity and light source type may be checked, ensuring specimen is illuminated appropriately, resulting in a clear and accurate slide image with desired quality control metric. In case of specimen's condition that may change over time, such as a live cell, scan time stamp may be validated against an optimal scanning time. If scanning timestamp associated with initial slide image 152 deviates significantly from the optimal scanning time, quality control metric may be determined and/or adjusted accordingly. For instance, and without limitation, if a cell is best imaged during mitosis and scanning timestamp indicates a post-mitotic scan, quality control metric may be lowered, or downgraded to reflect the reduced biological relevance of the generated slide image.

With continued reference to FIG. 1, in some embodiments, computing device 148 may be configured to generate quality control metadata as a function of quality control metric 160. As used in this disclosure, "quality control metadata" refers to a set of data that provides information about quality control metric of scanned slide image e.g., initial slide image 152. In some cases, quality control metadata may be derived from evaluation of one or more quality control metrics 160 as described above. In a non-limiting example, quality control metadata may include scores or values of quality control metrics 160, reasons for any deviations from pre-determined thresholds, specific areas of initial slide image 152 that were flagged for corresponding quality issues, recommendations or actions to improve image quality, and/or the like. In some cases, quality control metadata may serve as a comprehensive record/profile of quality assessment process performed by computing device 148, allowing for traceability, review, and further analysis as described in detail below.

Still referring to FIG. 1, in a non-limiting example, for a given set of quality control metrics 160 that evaluates the clarity, focus, color accuracy, and/or the like of initial slide image 152, computing device 148 may generate quality control metadata as a function of the set of quality control metrics 160 that detail specific values or scores for each of these parameters. In some cases, any deviations from expected values, and potential reasons for such deviations may be included in generated quality control metadata; for instance, and without limitation, quality control metadata may include one or more deviations indicating "dust on the slide," corresponding potential cause for the deviations e.g., "misalignment of slide on the stage" may be also included in quality control metadata as described herein.

With continued reference to FIG. 1, in some embodiments, determining quality control metric 160 may also include modifying, by computing device 148, generated quality control metadata as a function of a user input 164 received from a user. As used in this disclosure, "user input" refers to feedback, corrections, annotations, or any other form of input provided by a user regarding quality control metric 160, initial slide image 152, or slide 104 itself. In some cases, user may include a human operator. In other cases, user may include a system administrator. In an embodiment, user input 164 may be in form of manual adjustments to quality control metric 160, annotations on specific areas of initial slide image 152, comments about perceived inaccuracies, suggestions for recalibration or rescanning, and/or the like. In another embodiment, user input 164 may include adjustments to selection of optical component e.g., objective lens, focus parameters of selected objective lens, location of slide on stage 120 and/or slide port, position of stage 120, and/or the like. In other embodiments, user input 164 may include manual cleaning of devices in system 100.

Still referring to FIG. 1, in some cases, computing device 148 may include a feedback mechanism, wherein the user input 164 may incorporate human expertise and/or judgment entered by human operators into quality assessment process of initial slide image 152 as described herein, ensuring that quality control metric 160 and quality control metadata are not solely reliant on automated evaluations but also human knowledge. In a non-limiting example, a human operator and/or computing device 148 may notice/detect that a certain region of initial scan image 152 may appears overexposed based on quality control metric 164, leading to a loss of details in the region. Operator may input a user input adjusting exposure time parameter of imaging device 116 to a shorter duration to prevent overexposure upon reviewing associated scanning metadata 156. In some cases, computing device 148 may be configured to modify quality control metadata to reflect that overexposure was due to incorrect scanning parameters and not an inherent issue with the specimen. In some cases, user input may be implemented in a subsequent scan as described in detail below.

With continued reference to FIG. 1, in some cases, user input 164 may be entered through a user interface at a display device in a communicative connection with computing device 148. In some cases, computing device 148 may request, alert, or prompt user for user input 164 through user interface. As used in this disclosure, a "display device" is a device that is used to display content. A "user interface," as used herein, is a means by which a user and a computer system interact; for example, using input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface, wherein the "graphical user interface (GUI)," as used herein, is a graphical form of user interface that allows users to interact with electronic devices. User interface may include output interface and input interface. In some embodiments, output interface may include one or more elements through which at least one slide storage 108, imaging device 116, and/or computing device 148 may communicate information to a human operator. In some embodiments, user input 164 may be entered through input interface such as, without limitation, mouse, keyboard, touch screen, and/or the like. In a non-limiting example, output interface may include a display e.g., a high-resolution display. In some cases, display may output slide images, associated scanning metadata 156, quality control metrics/metadata, and the like to a user. In a non-limiting example, display device may display a notification on user interface, indicating the need for user input 164, wherein the notification may provide details about the quality control metrics along with generated quality control metadata for current processing slide. Additionally, or alternatively, computing device 148 may integrate with other output systems or devices, such as speakers (e.g., alarms), light sources (e.g., visual indicators), or even haptic feedback mechanisms.

With continued reference to FIG. 1, determining quality control metric 160 includes flagging slide based on quality control metric 160 as described above. As used in this disclosure, "flagging" means marking or identifying a slide that does not meet certain pre-defined quality standards based on quality control metric 160. In some cases, computing device 148 may be configured to highlight slides that potentially deviate from established quality benchmarks or thresholds. In some embodiments, computing device 148 may be configured to check each quality control metric 160 and/or generated quality control metadata against a database of pre-defined acceptable thresholds. In some cases, pre-defined acceptable thresholds within such database may be calibrated based on empirical data, industry stands, user-input criteria, and/or the like. In a non-limiting example, each slide image of plurality of slide images scanned using imaging device 116 for plurality of slides 112 may be assessed on pixel intensity distribution, sharpness index, color histogram balance, and the like. In some cases, if a slide's sharpness index falls below a designated value, indicating potential focus issues, or if its color histogram exhibits an abnormal distribution suggesting uneven staining or illumination, the slide may be flagged by computing device 148. Other exemplary embodiments of Still referring to FIG. 1, in some cases, slide 104 may be flagged if there's a significant deviation in the expected scanning parameters, for example, and without limitation, scan speed inconsistencies that may result from hardware malfunctions or calibration errors of at least one slide storage 108, transfer component 128, imaging device 116, and/or the like. In some cases, once a slide is flagged, it may be manually reviewed by a human operator. In other cases, automated rescanning procedures to rectify identified issues based on quality control metrics 160 and/or generated quality control metadata as described in further detail below, may be performed by computing device 148 on the flagged slide. In some cases, scanning metadata 156 associated with flagged slides may be stored in a separate database or directory. In some cases, flagged slide may be transferred and stored from imaging device 116 to a second slide storage using transfer component 128, ensuing easy accessibility for subsequent interventions.

Still referring to FIG. 1, initial slide image 152, associated scanning metadata 156, quality control metric 160, quality control metadata, and any data described in this disclosure, may be stored in, for example, memory of computing device 148 or a database 168. Database 168 may be implemented, without limitation, as a relational database, a key-value retrieval database such as a NOSQL database, or any other format or structure for use as a database that a person skilled in the art would recognize as suitable upon review of the entirety of this disclosure. Database 168 may alternatively or additionally be implemented using a distributed data storage protocol and/or data structure, such as a distributed hash table or the like. Database 168 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some cases, computing device 160 may determine quality control metric 160 using one or more machine learning models. In some embodiments, computing device may utilize a machine learning module to implement one or more machine learning algorithms as described in detail below with reference to FIG. 7, generating one or more machine learning models. However, the machine learning module is exemplary and may not be necessary to generate machine learning models and perform any machine learning tasks as described herein. In one or more embodiments, one or more machine-learning models, such as, without limitation, a slide image classifier may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements.

Still referring to FIG. 1, in some cases, exemplary inputs and outputs of training data may come from a database 168 as described above or be provided by a user (e.g., a human operator). In other cases, machine-learning module as described herein may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

Still referring to FIG. 1, in some embodiments, determining quality control metric 160 may include training, using slide image training data, the slide image classifier, wherein the slide image training data may include a plurality of slide images as input correlated to a plurality of quality control metrics as output, and classifying initial slide image 152 and associated scanning metadata 156 into a scanning state 172 using the trained slide image classifier. Slide image classifier may be generated using one or more classification algorithms as described below with reference to FIG. 4. In a non-limiting example, slide image classifier may include a CNN as described below with reference to FIG. 5 In some cases, slide image training data may include a plurality of slide images as input, each correlated to a scanning state 172 as output. As used in this disclosure, a "scanning state" refers to a designated categorization or status assigned to a slide after it has been scanned by imaging device 116 as described above. In some cases, scanning state 172 may provide a concise representation of the quality of scanned slide image e.g., initial slide image 152. In some cases, scanning state 172 may include a value representing a completeness of the scanning process of each slide of plurality of slides 112. In some embodiments, scanning state 172 may include an indicator of whether the scanned slide meets pre-defined quality criteria as described above, or if further actions, such as rescanning, are required. In some embodiments, slides may be flagged based on scanning state 172.

Still referring to FIG. 1, in a non-limiting example, scanning state 172 may include a binary scanning state, wherein the binary scanning state may include a first state e.g., "Scan Complete" indicating that slide 104 has been successfully scanned, and quality control metric 160 of resultant image i.e., initial slide image 152 meets all pre-defined quality benchmarks such as, without limitation, optimal sharpness, appropriate color balance, among others, and associated metadata 156 of initial slide image 152 may confirm that there were no hardware or software anomalies during scanning process. On the other hand, binary scanning state may include a second state e.g., "Re-scan Candidate" suggesting that initial slide image 152 of slide 104 does not meet quality criteria and needs to be rescanned. In some cases, reasons for a slide being flagged as "re-scan candidate" may include (slide storage 108, transfer component 128, imaging device 116, and/or computing device 148) hardware glitches (e.g., temporary malfunction of device), misalignment of slide or stage 120, wrong scanning (focus) parameters, smudges or stains on slide, and/or the like.

Still referring to FIG. 1, in a non-limiting example, if slide 104 is scanned and the resultant initial slide image 152 exhibits a sharpness value above a certain threshold and associated scanning metadata 156 confirms a consistent scanning speed and a correct illumination, slide 104 may be categorized under the "Scan Complete" state. Conversely, if initial slide image 152 shows signs of blurriness or if associated scanning metadata 156 indicates an irregular scanning speeds, suggesting potential hardware issues, such slide may be flagged under the "Re-scan Candidate" state, signaling computing device 148 the need for a subsequent re-scan to obtain a clearer image.

With continued reference to FIG. 1, it should be noted that, scanning state 172, apart from binary scanning state, may include multiple categories, in a non-limiting example, scanning state 172 may include an "Optimal Scan" state indicating that a slide scan is of superior quality with no discernible issues. In some cases, scanning state 172 may include an "Acceptable Scan" state indicating initial slide image may include one or more minor issues that do not warrant a rescan (as it meets basic criteria), but are noted for reference. In some cases, scanning state 172 may include a "Marginal Scan" indicating that the scan may have some issues that may affect the analysis of slide image but could not be rectified with imaging process techniques as described herein. In other cases, scanning state 172 may include a "Failed Scan" state indicating that a slide image for a particular slide has significant issues, making the slide image unsuitable for analysis, necessitating a rescan. As a person skilled in the art, upon reviewing the entirety of this disclosure, will be aware of various scanning states system 100 may employ for determining quality control metric for each slide of plurality of slides 112.

With continued reference to FIG. 1, computing device 148 is configured to generate at least one scanning profile 176 as a function of scanning metadata 156 based on quality control metric 160. As used in this disclosure, a "scanning profile" refers to a predefined set of parameters, configurations, and criteria used during scanning process of a slide or specimen. Computing device 148 may be configured to generate a plurality of scanning profiles based on quality control metrics associated with plurality of slide images 112. In some cases, scanning profile 176 may be utilized by imaging device 116 to generate slide image as described herein. In some embodiments, scanning profiles may be designed to optimize scanning process as described herein based on specific requirements or objectives, ensuring resultant slide images are of the desired quality and detail. In some cases, computing device 148 may be configured to select one or more scanning profiles during scanning process of plurality of slides 112. In some cases, a human operator may manually pick a particular scanning profile for scanning a particular slide, to suit the nature of a particular specimen contained in the slide, at a desired resolution, scanning speed, and other relevant factors. In a non-limiting example, scanning profile 176 may dictate how scanning process of plurality of slides 112 should be executed.

Still referring to FIG. 1, in an embodiment, scanning profile 176 may include a default scanning profile 180, wherein the "default scanning profile," for the purpose of this disclosure, is a standard or primary configuration used by system 100 when no specific scanning profile is selected. In some cases, default scanning profile 180 may be designed to provide a balance between scanning speed and quality, for example, and without limitation, default scanning profile 180 may be suitable for a wide range of general scanning tasks for a wide range of specimens. In these cases, default scanning profile 180 may include a high throughput scanning profile that prioritizes speed over other factors, allowing imaging device 116 for rapid scanning of a large number of slides in a short period (e.g., 4 minutes per slide).

Still referring to FIG. 1, in another embodiment, scanning profile 176 may include re-scan profile generated specifically for rescanning slides e.g., flagged slides or slides categorized as "Re-scan Candidate" as described above. In some cases, re-scan profile may be configured to address issues identified in the initial scan. In a non-limiting example, re-scan profile may employ higher resolution settings, higher focus parameters, slower scanning speed, enhanced illumination, and/or the like to ensure that identified issues in initial slide image are addressed. If slide 104 is initially scanned under high throughput profile and flagged for blurriness based on quality control metric 160 derived from generated initial scan image, re-scan profile may be implemented, by computing device 148 to obtain a clearer image. For instance, and without limitation, re-scan profile may reduce the scanning speed and increase the focus accuracy of imaging device 116.

With continued reference to FIG. 1, other exemplary embodiments of scanning profile 176 may include, without limitation, high resolution scanning profile (tailored for situations where utmost specimen detail is required e.g., where cellular structures or intricate tissue patterns need to be studied), low light scanning profile (designed for specimens e.g., fluorescently labeled specimens that are sensitive to light or when minimal light exposure is desired), or even custom scanning profile which allows users e.g., human operators to define, select, or modify their own set of parameters, or existing configurations and/or scanning profiles in the system, based on quality control metric 160, quality control metadata, user input 164, and/or the like. In some cases, scanning profile 176 may be stored in database 168 as described above. In some cases, scanning profile 176 may be correlated to at least a scanning state 172; for instance, and without limitation, a "re-scan candidate" state may automatically activate a "re-scan profile" such as a "high-resolution re-scan profile" that prioritize intricate details of specimen with increased optical sensor sensitivity and/or focus parameters.

With continued reference to FIG. 1, it should be noted that the above-listed scanning profile is illustrative and not exhaustive. As an ordinary person skilled in the art, upon reviewing the entirety of this disclosure, will be aware of other embodiments of scanning profiles system 100 may employ that are not explicitly described in this disclosure, and various modifications, adaptations, and alternations that can be made without departing from the scope of the described embodiments. Additionally, terms such as "high," "low," "standard," "fast," "slow," and the like are relative and should be interpreted in the context of the specific application and the known standards in the industry. Their usage in this document is for illustrative purposes and should not be construed to limit the scope of the current disclosure in any manner.

With continued reference to FIG. 1, scanning profile 176 may be generated based on associated scanning metadata 156. In a non-limiting example, computing device 148 may be configured to retrieve scanning metadata 156 from database 168. Scanning metadata associated with slide images with scanning state such as, without limitation, "Scan Complete," "Optimal Scan," "Acceptable Scan," and or the like may be used to generate scanning profile 176, wherein these metadata may be configured as references or baseline criteria for generating scanning profile 176. Additionally, or alternatively, generating scanning profile 176 may include fine-tuning associated scanning metadata 156. In some cases, parameters such as, without limitation, light source intensity, magnification level, optical sensor sensitivity, and/or the like may be adjusted based on algorithms such as autofocus, image stitching, color correction, among others that may be implemented by computing device 148.

Still referring to FIG. 1, further, one or more machine learning models may be employed, by computing device 148, to generate one or more scanning profile 176. In a non-limiting example, computing device 148 may receive scanning profile training data (from database 168 and/or human operators), wherein the scanning profile training data may include a plurality of slide images, quality control metrics/metadata e.g., specimen type or desired outcome as input, each correlated to a plurality of scanning parameter sets or configuration sets (i.e., scanning profiles) as output, train a scanning profile generator generated using machine learning module as described herein using the scanning profile training data, and generate at least one scanning profile 176 based on quality control metric 160 using the trained scanning profile generator.

With continued reference to FIG. 1, in some embodiments, generating at least one scanning profile 176 may include identifying at least one missed element 184 from initial slide image 152 of flagged slide as a function of quality control metric 160. As used in this disclosure, a "missed element" refers to any feature, structure, or detail of specimen on a slide that was not accurately captured, represented, or discerned in corresponding slide image of the slide. In some cases, missed element 184 may include an omission in scanning process caused by suboptimal scanning parameters, hardware limitations, software errors, slide quality issue, foreign particles, or even inherent characteristics of the specimen itself. In a non-limiting example, missed element 184 may be a cellular structure or anomaly that was not clearly imaged in a histopathological slide, leading to potential misinterpretations or misdiagnoses. In another non-limiting example, missed element 184 may include a microstructural defect or feature that is not discerned. In a further non-limiting example, missed element 184 may include missing scanning of any required content present on slide 104.

Still referring to FIG. 1, in some cases, missed element 184 may be identified based on a threshold analysis of quality control metric 160 of each slide of plurality of slides 112, for example, and without limitation, quality control metric 160 may be compared against one or more predefined threshold values for various parameters e.g., clarity, focus quality, contrast, and/or the like. If any of these parameters fall below the set threshold, an indicator indicating potential missed elements may arise. In a non-limiting example, initial slide image 152 with a clarity score below an acceptable range may have blurred regions where cellular structures or other details are not discernible. In some cases, missed element 184 may be identified by comparing initial slide image 152 with a reference or standard image. Missed element 184 may be identified as a function of any discrepancies identified from such comparison. In a non-limiting example, if quality control metric determined based on initial slide image 152 indicates a significant deviation from the reference, it may suggest a presence of one or more missed elements 184.

Still referring to FIG. 1, in some cases, quality control metadata generated from quality control metric 160 as described above, which includes a detailed record of multiple scanning parameters and resultant quality scores, may be analyzed by computing device 148 to identify missed elements 184. In a non-limiting example, if quality control metadata indicates a particular region of slide 104 is scanned with one or more suboptimal focus settings, computing device 148 may identify that particular region as missed element 184. Additionally, or alternatively, advanced image processing algorithms may be used and/or machine learning models may be trained to recognize common patterns associated with missed elements 184 as described herein. In some cases, training data may include a plurality of slide images, quality control metrics and metadata as input, correlated to a plurality of missed elements as output. In some cases, missed element 184 may include a value describing the likelihood of missed element in scanned image of each slide. Further, missed element 184 may be manually defined based on user input 164 as described above. In a non-limiting example, one or more user feedbacks from users e.g., pathologies or human operators may include identification of missed element 184 in initial scan imager 152. In some cases, user feedbacks may be added to quality control metadata or training data to improve the accuracy of missed element detection as described herein.

With continued reference to FIG. 1, in some embodiments, generating at least one scanning profile 176 may also include selecting a plurality of scanning parameters 188 configured to address at least one missed element 184. As used in this disclosure, "scanning parameters" refers to variables or configurations that dictate how scanning/re-scanning process is executed. In some cases, plurality of scanning parameters 188 may influence the quality, resolution, speed, and other attributes of scanned images of plurality of slides 112. In some cases, scanning parameters may include, without limitation, pre-scan devices settings, resolution (in DPI or PPI), focus parameters, magnification level, illumination settings (e.g., type of the light, light intensity, angle of light, and the like), scan speed, filter setting (e.g., selection of filters that enhance or suppress certain wavelengths of light), post-scan image processing algorithms, scan patterns (i.e., path or sequence in which imaging device 116 captures the specimen e.g., linear, serpentine, or based on regions of interest [ROIs]). As a person skilled in the art, upon reviewing the entirety of this disclosure, will be aware of various scanning parameters may be selected for slide scanning or re-scanning purposes.

Still referring to FIG. 1, in some cases, one or more scanning parameters 188 may be selected or adjusted to address identified missed element 184, In a non-limiting example, computing device 148 may identify a region of initial slide image 152 as missed element 184 due to poor focus based on quality control metric 160, additional focus parameters may be selected and/or existing focus parameters may be adjusted for that region in subsequent scan. At least one scanning profile 176 may be generated as a function of plurality of scanning parameters 188. In some cases, scanning profile 176 may be generated or modified based on adjusted scanning parameters. In some cases, imaging device 116 may employ at least one scanning profile 176 to handle missed element 184 of initial slide image 152 in a subsequent slide image of the slide as described in detail below. In a non-limiting example, one or more additional lighting parameters may be selected, and existing lighting parameters may be tweaked to fix cellular structure visibility issue caused by inadequate illumination during the initial scan process determined based on quality control metrics 160 of generated initial slide image. Computing device 148 may generate a scanning profile based on these lighting parameters and apply the generated scanning profile during the next scan of the slide.

With continued reference to FIG. 1, in an embodiment, plurality of scanning parameters 188 may include a plurality of imaging device configuration parameters, wherein the plurality of "imaging device configuration parameters," for the purpose of this disclosure, refers to specific setting s made to image device 116 as described herein, which commands imaging device's 116 operational behavior during scanning/re-scanning process. In some cases, system 100 may include more than one imaging device. In some embodiments, system 100 may include a plurality of imaging devices, wherein each imaging device of the plurality of imaging devices is at a different setting (i.e., different set of imaging device configuration parameters). In a non-limiting example, scanning profile 176 may further include a selection of imaging device of plurality of imaging devices that are currently available based on quality control metric 160 and/or quality control metadata. Exemplary imaging device configuration parameters may include, without limitation, optical sensor setting (e.g., ISO, exposure time, pixel binning, and the like), aperture size, focal length, zoom level, wavelength selection, stage selection, and/or the like. In a non-limiting example, scanning profile 176 may designate an imaging device with high magnification and optical sensor sensitivity to scan slide with specimen that requires detailed imaging at a cellular level.

Still referring to FIG. 1, in some cases, plurality of scanning parameters 188 may be stored in database 168 as described above. Selecting plurality of scanning parameters 188 may be done manually by human operators based on his or her expertise. In other cases, one or more machine learning models may be trained, by computing device 148, using scanning parameter training data, wherein the scanning parameter training data may include a plurality of missed elements as input correlated to a plurality of scanning parameter sets as output, and automatically selecting plurality of scanning parameters 188 as a function of missed element 184 using the trained scanning parameter selection model. In some cases, scanning parameter training data may be received from database 168. In some cases, scanning parameter training data may further include slide images, associated scanning metadata, quality control metrics, and/or quality control metadata as input correlated to a plurality of scanning parameters as output.

With continued reference to FIG. 1, computing device 148 is configured to re-scan one or more flagged slides 192 within plurality of slides 112 at imaging device 116 using at least one scanning profile 176 as described above. In some cases, flagged slides 192 may include slides associated with scanning state as "Re-scan Candidate." In a non-limiting example, flagged slides 192 may include slides with generated slide image that initially exhibit artifacts, blurriness, or incomplete image capture due to various reasons such as, mechanical disturbance, suboptimal lighting conditions and/or focus parameters, misalignment of the slide, and the like as described above during the initial scan. In some cases, re-scanning flagged slides 192 may include scanning flagged slides using scanning profile 176. In some cases, re-scanning flagged slides 192 may include adjusting imaging device configuration parameters according to scanning profile 176. In some cases, re-scanning flagged slides 192 may include scanning flagged slides on a second imaging device based on scanning profile 176. In a non-limiting embodiment, re-scanning flagged slides 192 may include applying scanning profile 176 to imaging device 116, wherein applying scanning profile 176 may include modifying scanning metadata 156 based on plurality of scanning parameters incorporated thereof. A subsequent slide image 196 for each flagged slide may be generated, by computing device 148, by re-scanning slide 104 using scanning profile 176 using imaging device 116.

With continued reference to FIG. 1, in some embodiments, re-scanning flagged slides 192 may include scanning identified missed element 184 using at least one scanning profile 176 to generate a slide image shard. As used in this disclosure, a "slide image shard" refers to a segmented or partial slide image capture of a slide, specifically targeting and capturing missed element 184. In some cases, unlike full slide image (or WSI), which provides a comprehensive view of entire slide, slide image shard may focus on capturing only a designated area of interest ROI, wherein the ROI may contain one or more missed elements 184. In case where flagged slides 192 do not need to be re-scanned, but only specific regions that are previously missed or inadequately captured, one or more slide image shards may be generated for each flagged slide using scanning profile 176, wherein such scanning profile 176, in some cases, may include increased optical zoom level, increased light exposure, optimal focus parameters, and/or the like.

Still referring to FIG. 1, additionally, or alternatively, subsequent slide image of each flagged slide may be generated by merging initial slide image 152 and slide image shard as described above. Once slide image shard is captured, it may be seamlessly integrated with initial slide image 152, creating a composite image that combines features of both scans. In some cases, merging process may include aligning slide image shard with corresponding region in initial slide image 152, for example, and without limitation, computing device 148 may be configured to utilize one or more image registration techniques e.g., feature-based registration where key features in both images are identified and used as reference points for alignment. In some cases, a weighted blending algorithm may be employed, by computing device 148, to smooth the transition between boundaries of slide image shard and initial slide image 152. In some cases, multi-resolution blending or Laplacian pyramid blending may be used to merge images at multiple resolutions (caused by scanning the slide with different scanning profiles), ensuring that details of specimen are preserved in composite image. Further, any discrepancies in brightness or color between slide image shard and initial slide image 152 may be adjusted using histogram matching or other color correction algorithms.

Still referring to FIG. 1, in a non-limiting example, computing device 148 may combine slide image shard and initial slide image 152 of each flagged slide through image fusion. As used in this disclosure, "image fusion" is a process of gathering important information from multiple images into fewer, usually one image. One method of image fusion includes multi-focus image fusion. As used in this disclosure, "multi-focus image fusion" is image fusion process that combines input images having different focus depths to create at least an output image comprising at focus image data from the input images. According to some embodiments, multi-focus image fusion may include selection of at focus image data from multiple input images. Determination of at focus image data may be performed on a per pixel basis, for example according to one or more image fusion metrics. Generally, image fusion may be categorized according to two categories: transform and spatial domains. Commonly used transforms for image fusion are Discrete cosine transform (DCT) and Multi-Scale Transform (MST). In some cases, image fusion may be based on MST. Exemplary MST methods include Laplacian pyramid transform, gradient pyramid-based transform, morphological pyramid transform and the premier ones, discrete wavelet transform, shift-invariant wavelet transform (SIDWT), and discrete cosine harmonic wavelet transform (DCHWT). In some cases, DCT-based methods may be more efficient in terms of transmission and archiving images compared with MST. In some cases, DCT may be employed on images encoded in Joint Photographic Experts Group (JPEG). A JPEG system consists of a pair of an encoder and a decoder. In the encoder, images are divided into non-overlapping 8×8 blocks, and the DCT coefficients are calculated for each. Since the quantization of DCT coefficients is a lossy process, many of the small-valued DCT coefficients are quantized to zero, which corresponds to high frequencies. DCT-based image fusion algorithms work better when the multi-focus image fusion methods are applied in the compressed domain. In some cases, DCT domain-based image fusion methods do not require consecutive decoding and encoding operations. Exemplary DCT image fusion processes include DCT+Variance, DCT+Corr_Eng, DCT+EOL, and DCT+VOL.

Still referring to FIG. 1, in some cases, image fusion methods may additionally or alternatively include processes in the spatial domain. Image fusion may employ determination and use of focus measurements including variance, energy of image gradient (EOG), Tenenbaum's algorithm (Tenengrad), energy of Laplacian (EOL), sum-modified-Laplacian (SML), and spatial frequency (SF). Image fusion may include aggregating infocus regions from multiple input images into an image. In some cases, boundaries, either at an edge of an image or between regions having different in focus input images may be processed differently. For instance, in some cases, section of an image at a boundary between two (or more) in focus images may be processed as a weighted average of values from the two (or more) nearest in focus images. In some cases, one or more machine learning processes as described herein may be used to aid in image fusion processes.

Figure 2:
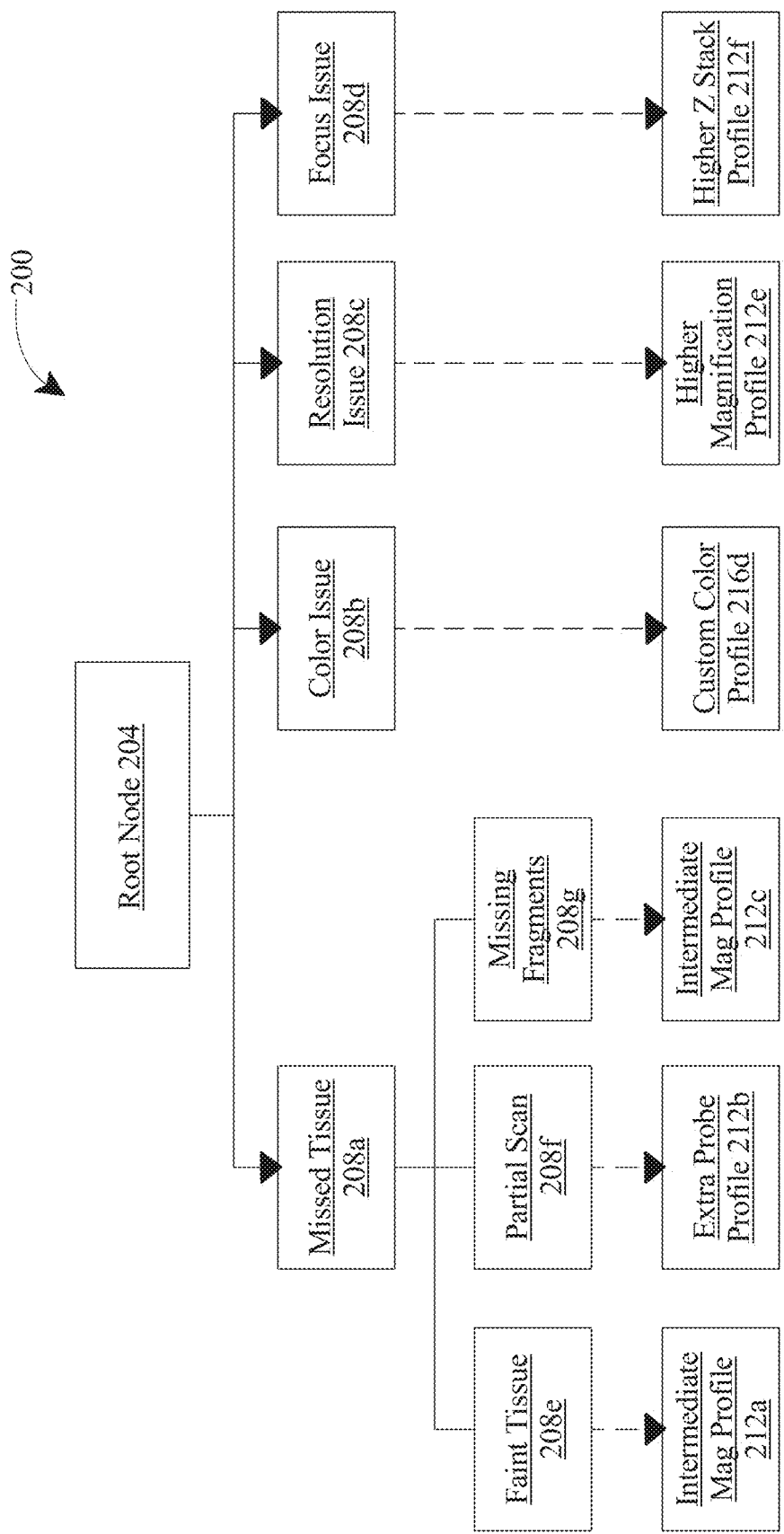
FIG. 2 illustrates an exemplary embodiment of a decision tree involved in automated generation of scanning profile.

Now referring to FIG. 2, an exemplary embodiment of a decision tree 200 involved in automated generation of scanning profile is illustrated. As described herein, a "decision tree" refers to a data structure that represents and combines one or more determinations or other computations based on and/or concerning data provided thereto, as well as earlier such determinations or calculations, as nodes of a tree data structure where inputs of some nodes are connected to outputs of others. In a non-limiting example, a decision logic for selecting at least one scanning profile 176 from a plurality of pre-determined or existing scanning profiles may be implemented as a decision tree. In some cases, generating at least one scanning profile 176 as a function of scanning metadata 156 may include selecting at least one scanning profile 176 from a plurality of scanning profiles as a function of decision tree 200 traversal based on quality control metric 160 and/or quality control metadata as described above with reference to FIG. 1.

Still referring to FIG. 2, as used in this disclosure, a "node" of a tree is an entity which contains a value or data and optionally contains one or more connection to other nodes. Plurality of nodes within decision tree 200 may include at least a root node 204, or node that receives processed scanning data 156, quality control metric 160, and/or quality control metadata to decision tree 200, such as, without limitation, overall or individual quality scores of scanned slide image. Intermediate nodes 208*a-g* within plurality of nodes within decision tree 200 may include, without limitation, quality control metadata categories; for instance, and without limitation, "missed tissue," "color issue," "resolution issue," "focus issue," and/or the like. In some cases, intermediate nodes 208*a-g* may also include one or more quality control metadata sub-categories (internal nodes 208*e-g* connected to node 208*a*) e.g., "faint tissue," "partial scan," "missing fragments," and/or the like.

Still referring to FIG. 2, Plurality of nodes within decision tree 200 may include a plurality of terminal nodes 212*a-f*, which may alternatively or additionally be referred to herein as a "leaf node," corresponding to an execution result of decision tree 200. In other words, decisions and/or determinations produced by decision tree 200 may be output at the at least a terminal node. In a non-limiting example, decision tree 200 may include a plurality of terminal nodes 212*a-f*, each terminal node of the plurality of terminal nodes 212*a-f* may include at least one scanning profile as described herein.

Still referring to FIG. 2, in some cases, scanning profile may include an "Intermediate Mag Profile (IMP)," wherein the IMP may be designed to address issues related to faint tissue and missing fragments. In an embodiment, IMP may use an intermediate level of magnification to enhance the visibility of faint tissue structures, ensuring that no tissue fragments are missed during the scanning process. In a non-limiting example, imaging device 116 may capture details that may be overlooked at lower magnifications by adjusting to an intermediate level, while avoiding excessive detail or noise that may come with high magnifications.

Still referring to FIG. 2, in some cases, scanning profile may include an "Extra Probe Profile (EPP)," wherein the EEP may be tailored for situations where there's missed tissue due to a partial scan. In an embodiment, EEP may employ additional or more sensitive probes to ensure comprehensive scanning coverage. In a non-limiting example, EEP may involve multiple passes or using probes that have a wider field of view or greater sensitivity to ensure that no part of the slide is left unscanned.

Still referring to FIG. 2, in some cases, scanning profile may include a "Custom Color Profile (CCP)," wherein the CCP may be configured to address color discrepancies or inconsistencies in the scanned images. In an embodiment, CCP may allow for calibration and adjustment of imaging device's 116 color settings. In a non-limiting example, colors in subsequent slide image 196 may be accurately represented captured by imaging device under CCP compared to the color of the actual slide. In some cases, color issue may be raised when analyzing stained tissue samples where color differentiation is vital.

Still referring to FIG. 2, in some cases, scanning profile may include a "Higher Magnification Profile (HMP)," wherein the HMP may be used to resolve issues related to image resolution. In an embodiment, HMP may use a higher magnification setting to capture finer details of the slide. In a non-limiting example, imaging device 116 under HMP may have an increased magnification level, slide images with more intricate structures and details may be captured, ensuring a clearer and more detailed scan.

Still referring to FIG. 2, in other cases, scanning profile may include a "Higher Z Stack Profile (HZSP)," wherein the HZSP may be configured to address focus issues in initial slide image 152. In an embodiment, HZSP may include configuring imaging device 116 to capture multiple images at different focal planes (e.g., increased number of focal planes with an increased field of depth) and then combining them to produce a single, in-focus slide image (i.e., Z-stack). In a non-limiting example, for thick or uneven samples where focus issues may arise, different parts of the sample may be in focus at different depths. By employing HZSP, imaging device 116 may ensure that all parts of sample may be in focus in subsequent slide image 196.

With continued reference to FIG. 2, in some cases, computing device 148 may generate two or more decision trees 200, which may overlap. In a non-limiting example, decision tree 200 may establish a link to a remote decision module, device, system, or the like. Root node 204 of decision tree 200 may connect to and/or receive output from one or more terminal nodes of another decision tree (not shown), One or more nodes of plurality of nodes such as, intermediate nodes of decision tree 200 may be shared with another decision tree, or the like. In some embodiments, decision tree 200 may be configured to use one or more application programming interface (APIs) to receive scanning metadata 156 and/or incorporate plurality of quality control metric 160 or quality control metadata. In other embodiments, decision tree 200 may perform one or more database lookups and/or look-up table lookups.

Still referring to FIG. 2, In a non-limiting example, based on the scanning metadata 156 and quality control metric 160 or metadata, selection of one or more scanning parameters 188 can be automated as a function of decision tree 200 traversal, leading to creation of a custom scanning profile per slide being rescanned; however, if required, user e.g., a human operator may be able to customize the determined or selected scanning profile. It should be noted that scanning profiles as shown in FIG. 2 are only a subset of possible profiles, and the actual range of profiles can vary based on the hardware components available on imaging device 116. As a person skilled in the art, upon reviewing the entirety of this disclosure, will recognize that described system 100 may be expanded, modified, or adapted to incorporate newer scanning techniques, advanced hardware components, and evolving software algorithms to further enhance the scanning process and image quality.

Figure 3:
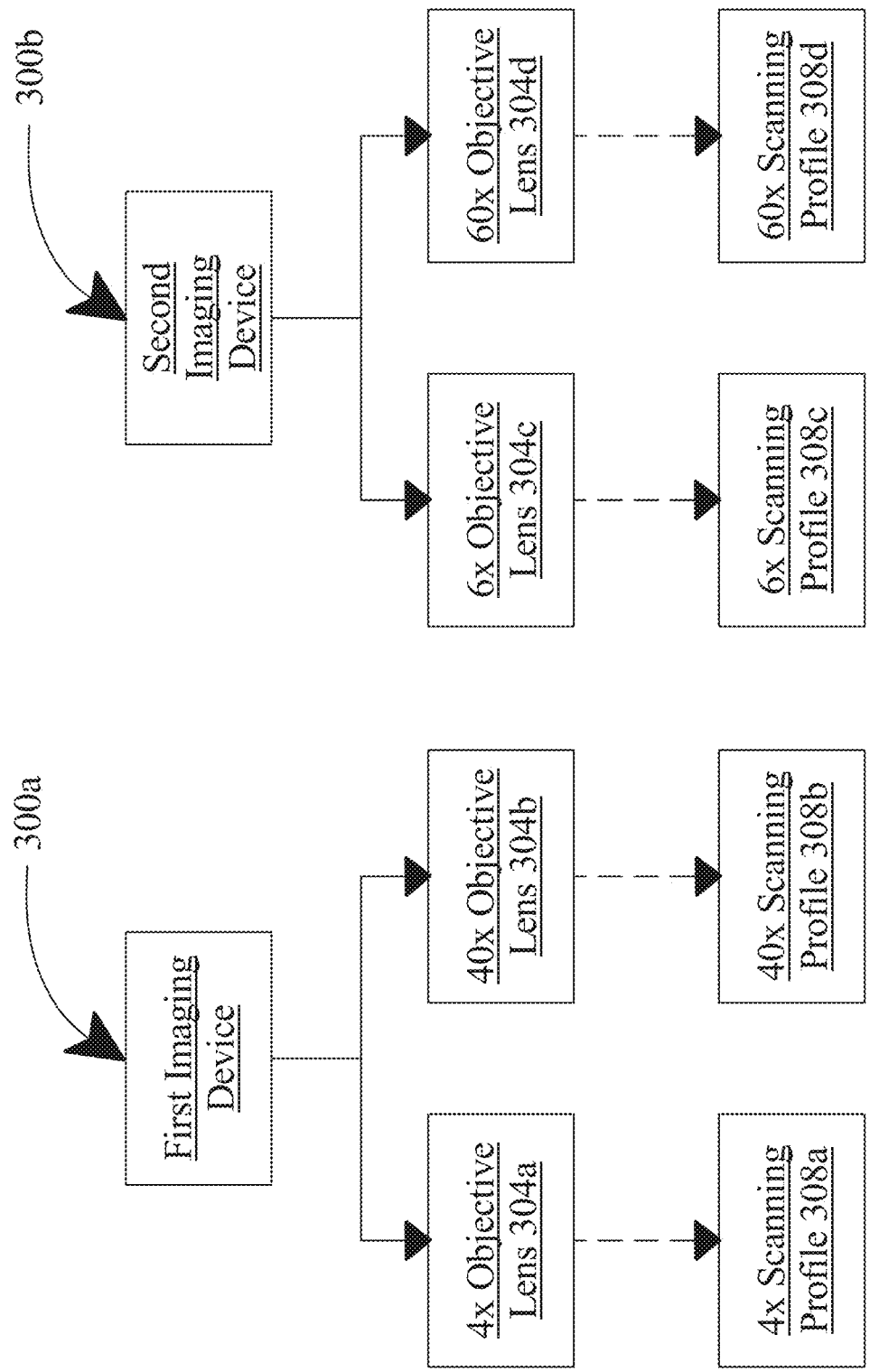
FIGS. 3A-B illustrate exemplary embodiments of scanning parameters for hardware components.

Now referring to FIG. 3A, an exemplary embodiment of scanning parameter for a first imaging device 300a is illustrated. In some cases, first imaging device e.g., a first imaging device 300a may be partially configured with 4× objective lens 304a and 40× objective lens 304b. In a non-limiting example, 4× objective lens 304a may be associated with a 4× scanning profile 308a while 40× objective lens 304b may be associated with 40× scanning profile 308b. In some cases, 4× scanning profile 308a may be primarily used for broader, overview scans of specimen, capturing larger areas with less magnification. In other cases, 40× scanning profile 308b may offer a higher magnification, allowing for detailed, close-up views of specific ROI within specimen.

Now referring to FIG. 3B, an exemplary embodiment of scanning parameters for a second imaging device 300b is illustrated. In some cases, second imaging device e.g., a second imaging device 300b may be partially configured with 6× objective lens 304c and 60× objective lens 304d. Similarly, 6× objective lens 304c may be associated with a 6× scanning profile 308c while 60× objective lens 304d may be associated with 60× scanning profile 308d. In some cases, 6× scanning profile 308c may be used for intermediate-level magnification scans, offering a balanced view that captures a relatively broad area while still providing a decent level of details. In other cases, 60× scanning profile 308d may offer an extremely high level of magnification, ideal for in-depth examinations of specific regions within the specimen.

Figure 4:
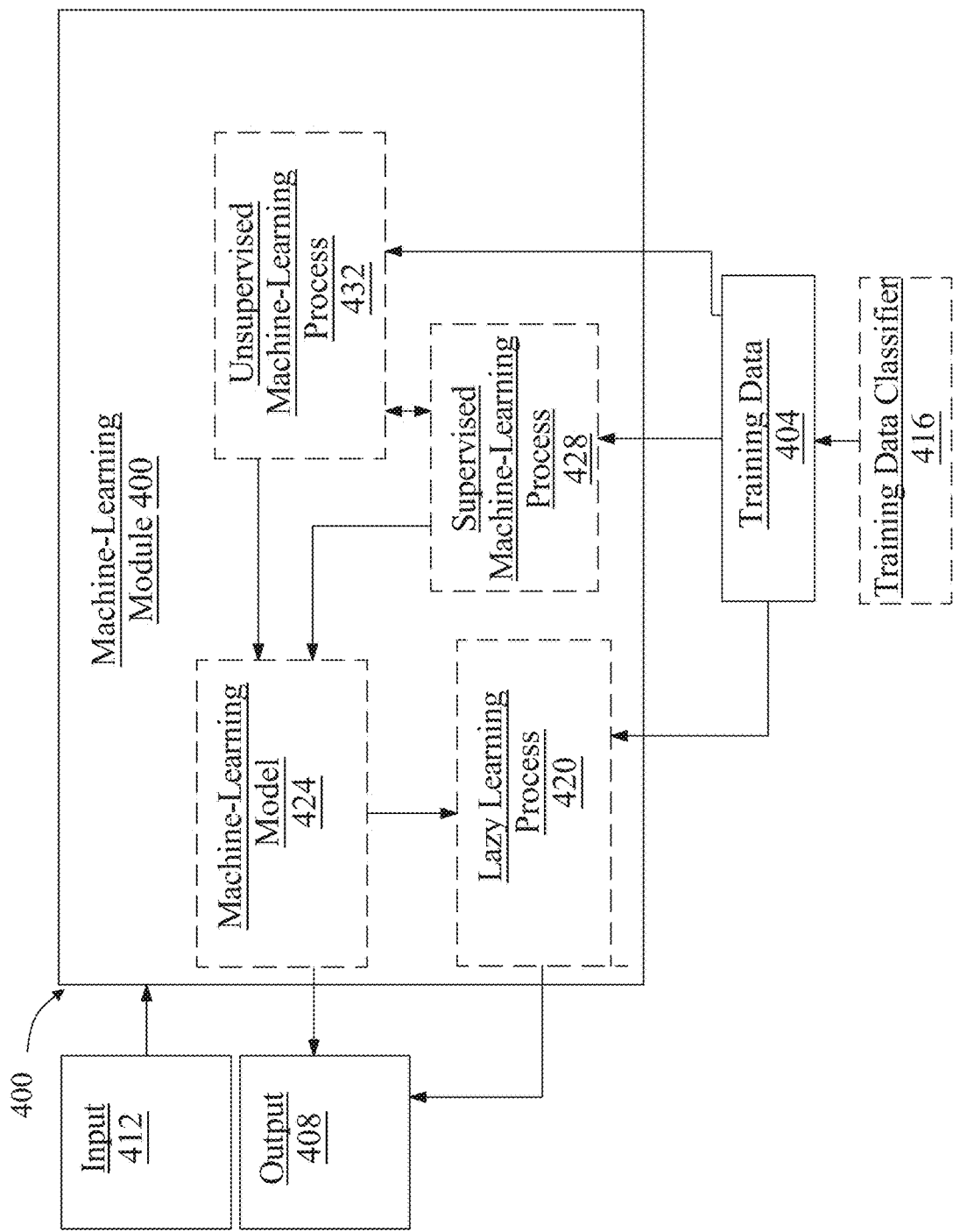
FIG. 4 is a block diagram of an exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, training data may include a plurality of slide images as input correlated to a plurality of scanning state as output.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data based on specific demographic and phenotypic attributes, leading to the identification of distinct sub-populations within the dataset. These attributes may include age, gender, ethnicity, genetic markers, environmental exposures, medical history, and specific physiological or pathological conditions associated with the specimen.

Still referring to FIG. 4, computing device 404 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)-P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 404 may then calculate a likelihood table by calculating probabilities of different data entries and classification labels. Computing device 404 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device 404 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l = \sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to cleanup side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of scanning metadata and quality control metric or metadata as described above as inputs, plurality of scanning profiles as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
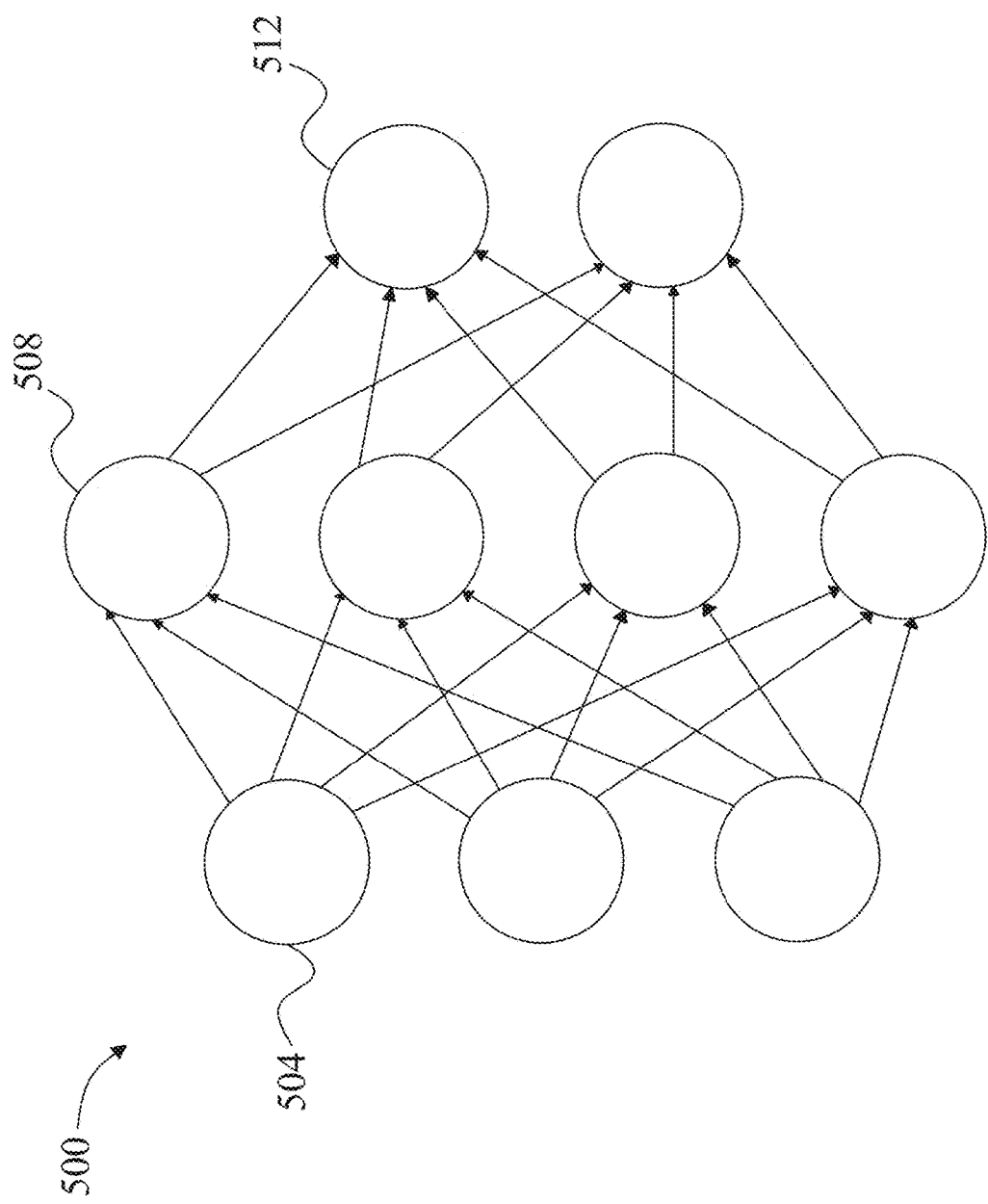
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

With continued reference to FIG. 5, in an embodiment, neural network 500 may include a deep neural network (DNN). As used in this disclosure, a "deep neural network" is defined as a neural network with two or more hidden layers. In a non-limiting example, DNN may include a convolutional neural network (CNN). Determining contaminant presence indicator may include training CNN using slide image training data as described above and determining quality control metric 160 e.g., scanning state 172 using trained CNN. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., slide images through a sliding window approach. In some cases, convolution operations may enable computing device to detect local/global patterns, edges, textures, and any other features described herein within slide images. Features may be passed through one or more activation functions, such as without limitation, Rectified Linear Unit (ReLU), to introduce non-linearities into determination of quality control metric 160. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying down-sampling, such as max-pooling or average pooling, to small, non-overlapping regions of one or more features.

Still referring to FIG. 5, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, scanning state 172. Further, each fully connected layer may be followed by one or more dropout layers configured to prevent overfitting, and one or more normalization layers to stabilize the learning process described herein.

With continued reference to FIG. 5, in an embodiment, training the CNN may include selecting a suitable loss function to guide the training process. In a non-limiting example, a loss function that measures the difference between the predicted scanning state 172 and the ground truth may be used, such as, without limitation, mean squared error (MSE) or a custom loss function may be designed for one or more embodiments described herein. Additionally, or alternatively, optimization algorithms, such as stochastic gradient descent (SGD), may then be used to adjust the CNN parameters to minimize such loss. In a further non-limiting embodiment, instead of directly predicting scanning state 172, CNN may be trained as a regression model to predict numeric values e.g., quality score associated with slides. Additionally, CNN may be extended with additional deep learning techniques, such as recurrent neural networks (RNNs) or attention mechanism, to capture additional features and/or data relationships within input data.

Figure 6:
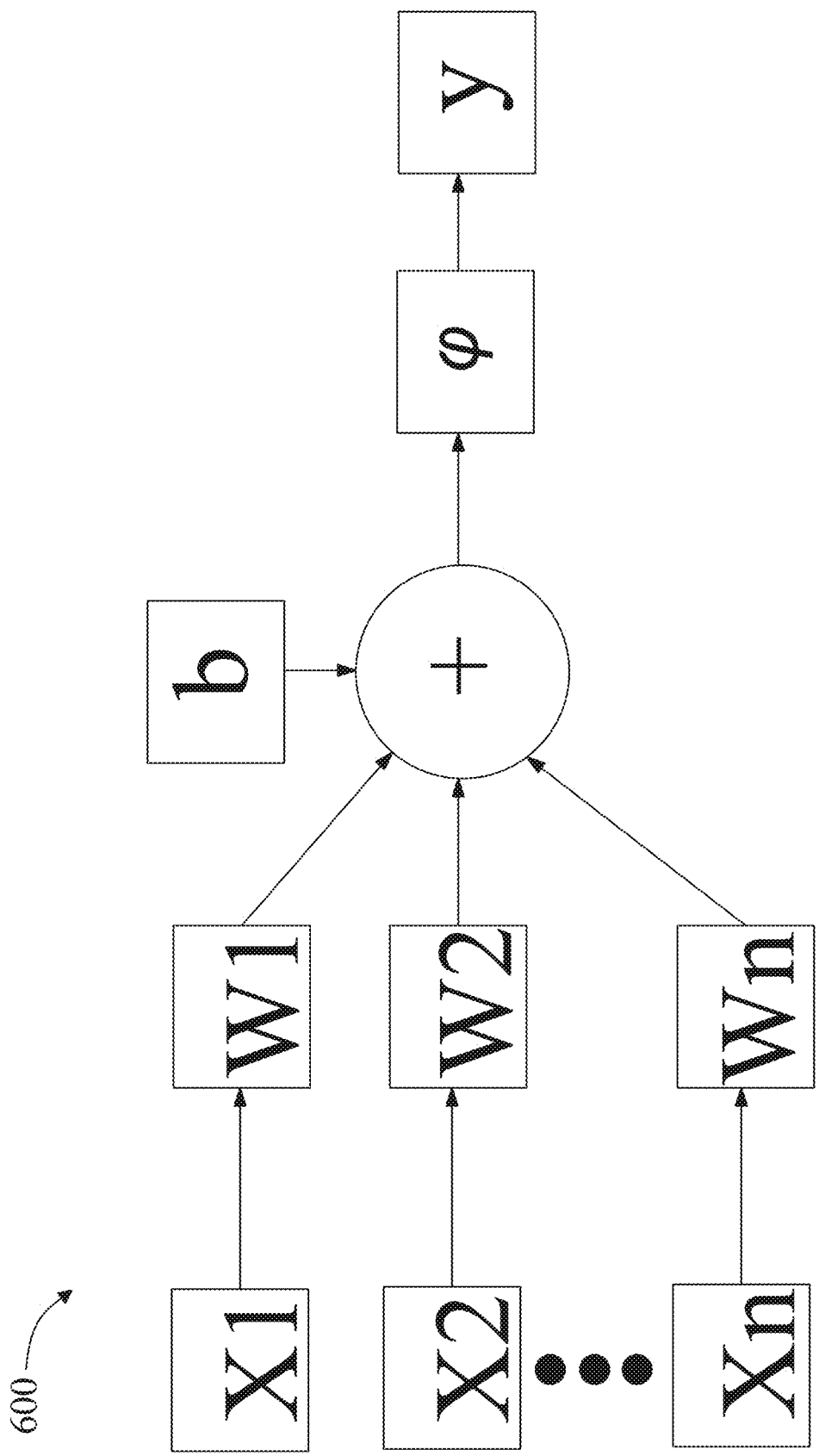
FIG. 6 is a block diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a(1 + \tanh(\sqrt{2/\pi}(x + bx^r)))$$

for some values of a, b, and r, and/or a scaled exponential linear unit function such as $$f(x) = \lambda \begin{cases} \alpha(e^x - 1) & \text{for } x < 0 \\ x & \text{for } x \leq 0 \end{cases}.$$

Fundamentally, there is no limit to the nature of functions of inputs x; that may be used as activation functions. As a non-limiting and illustrative example, node may perform a weighted sum of inputs using weights w, that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x; may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 7:
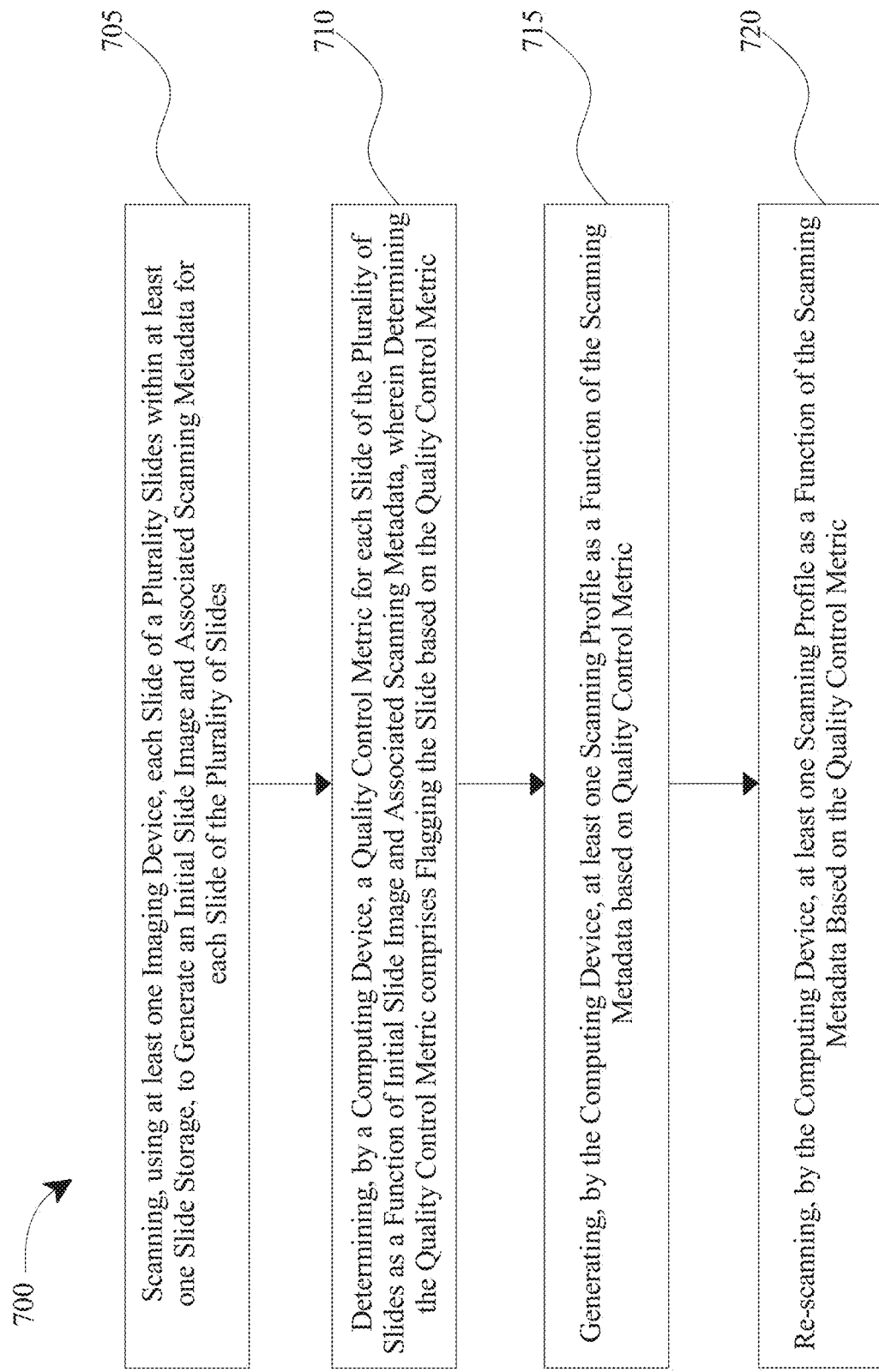
FIG. 7 is a flow diagram illustrating an exemplary embodiment of a method of digitalizing a slide.

Now referring to FIG. 7, a flow diagram of an exemplary embodiment of a method 700 of digitalizing a slide is illustrated. Method 700 includes a step 705 of scanning, using at least one imaging device, each slide of a plurality of slides, to generate an initial slide image and associated scanning metadata for each slide of the plurality of slides. In some embodiments, generating the initial slide image and associated scanning metadata for each slide of the plurality of slides may include imaging, using the at least one imaging device, each slide of the plurality of slides based on a default scanning profile. This may be implemented, without limitation, as described above with reference to FIGS. 1-6.

Still referring to FIG. 7, method 700 may include a step of transferring, using a transfer component positioned between the at least one imaging device and at least one slide storage, each slide of the plurality of slides between the at least one slide storage and the at least one imaging device. In some cases, the at least one slide storage may be configured to store the plurality of slides. This may be implemented, without limitation, as described above with reference to FIGS. 1-6.

With continued reference to FIG. 7, method 700 includes a step 710 of determining, by a computing device, a quality control metric for each slide of the plurality of slides as a function of the initial slide image and the associated scanning metadata, wherein determining the quality control metric includes flagging the slide based on the determined quality control metric. In some embodiments, wherein flagging the slide may include classifying, by the computing device, the initial slide image and the associated scanning metadata into a scanning state using a slide image classifier and flagging, by the computing device, the slide as a function of the scanning state. In some embodiments, determining the quality control metric may include generating, by the computing device, quality control metadata as a function of the quality control metric and modifying, by the computing device, the quality control metadata as a function of a user input received from a user. This may be implemented, without limitation, as described above with reference to FIGS. 1-6.

With continued reference to FIG. 7, method 700 includes a step 715 of generating, by the computing device, at least one scanning profile as a function of the scanning metadata based on the quality control metric. In some embodiments, generating the at least one scanning profile may include identifying, by the computing device, at least one missed element from the initial slide image of the flagged slide as a function of the quality control metric, selecting, by the computing device, a plurality of scanning parameters configured to address the at least one missed element, and generating, by the computing device, the at least one scanning profile as a function of the plurality of scanning parameters. In some cases, selecting the plurality of scanning parameters may include training, by the computing device, a scanning parameter selection model using scanning parameter training data, wherein the scanning parameter training data may include a plurality of missed elements as input correlated to a plurality of scanning parameter sets as output, and selecting, by the computing device, the plurality of scanning parameters as a function of the at least one missed element using the trained scanning parameter selection model. In some cases, the plurality of scanning parameters may include a plurality of imaging device configuration parameters. This may be implemented, without limitation, as described above with reference to FIGS. 1-6.

With continued reference to FIG. 7, method 700 includes a step 720 of re-scanning, at the at least one imaging device, the flagged slides within the plurality of slides at the imaging device using the at least one scanning profile. In some embodiments, re-scanning the flagged slide may include scanning, at the at least one imaging device, the identified missed element using the at least one scanning profile to generate a slide image shard of the flagged slide. This may be implemented, without limitation, as described above with reference to FIGS. 1-6.

With continued reference to FIG. 7, method 700 may further include a step of generating, by the computing device, a subsequent slide image for each flagged slide using the at least one scanning profile by merging the initial slide image and the slide image shard of the flagged slide. This may be implemented, without limitation, as described above with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
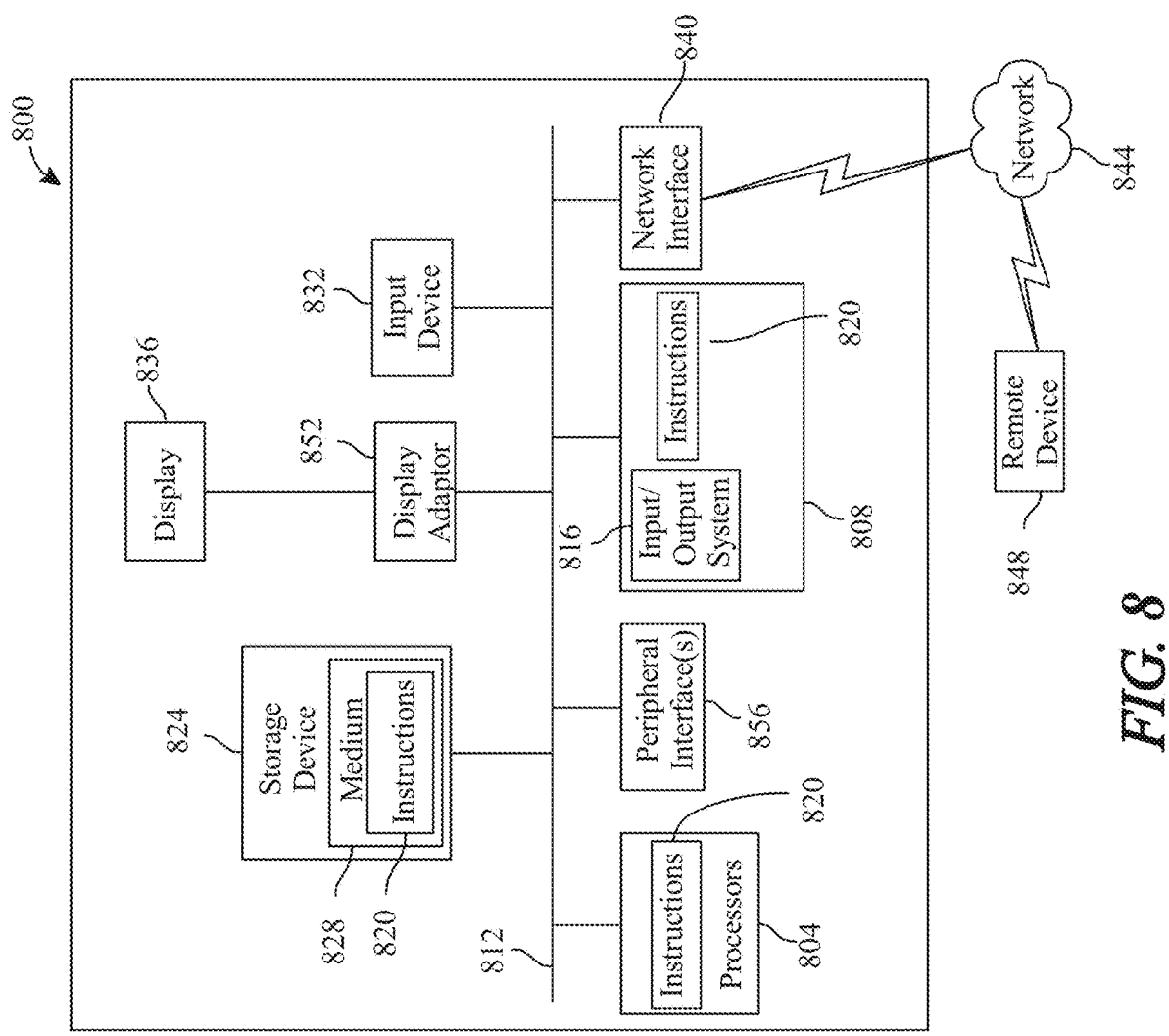
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system of digitalizing a slide, wherein the system comprises:
    at least one imaging device; and
    a computing device communicatively connected to the imaging device, wherein the computing device is configured to:
        scan each slide of a plurality of slides at the imaging device to generate an initial slide image and associated scanning metadata for each slide of the plurality of slides;
        determine a quality control metric for each slide of the plurality of slides as a function of the initial slide image and the associated scanning metadata, wherein determining the quality control metric comprises:
            flagging a slide based on the determined quality control metric;
        generate at least one scanning profile as a function of the scanning metadata based on the quality control metric; and
        re-scan the flagged slides within the plurality of slides at the imaging device using the at least one scanning profile.

2. The system of claim 1, further comprises:
    at least one slide storage containing the plurality of slides; and
    a transfer component positioned between the at least one imaging device and the at least one slide storage, wherein the transfer component is configured to:
        transfer each slide of the plurality of slides between the at least one slide storage and the at least one imaging device.

3. The system of claim 1, wherein generating the initial slide image and associated scanning metadata for each slide of the plurality of slides comprises:
    imaging, using the at least one imaging device, each slide of the plurality of slides based on a default scanning profile.

4. The system of claim 1, wherein flagging the slide comprises:
    classifying, by the computing device, the initial slide image and the associated scanning metadata into a scanning state using a slide image classifier; and
    flagging, by the computing device, the slide as a function of the scanning state.

5. The system of claim 1, wherein determining the quality control metric comprises:
    generating, by the computing device, quality control metadata as a function of the quality control metric; and
    modifying, by the computing device, the quality control metadata as a function of a user input received from a user.

6. The system of claim 1, wherein generating the at least one scanning profile comprises:
    identifying, by the computing device, at least one missed element from the initial slide image of the flagged slide as a function of the quality control metric;
    selecting, by the computing device, a plurality of scanning parameters configured to address the at least one missed element; and
    generating, by the computing device, the at least one scanning profile as a function of the plurality of scanning parameters.

7. The system of claim 6, wherein the plurality of scanning parameters comprises a plurality of imaging device configuration parameters.

8. The system of claim 6, wherein selecting the plurality of scanning parameters comprises:
    training, by the computing device, a scanning parameter selection model using scanning parameter training data, wherein the scanning parameter training data comprises a plurality of missed elements as input correlated to a plurality of scanning parameter sets as output; and
    selecting, by the computing device, the plurality of scanning parameters as a function of the at least one missed element using the trained scanning parameter selection model.

9. The system of claim 6, wherein re-scanning the flagged slide comprises:
    scanning, at the at least one imaging device, the identified missed element using the at least one scanning profile to generate a slide image shard of the flagged slide; and generate a subsequent slide image for each flagged slide using the at least one scanning profile by merging the initial slide image and the slide image shard of the flagged slide.

10. The system of claim 7, wherein re-scanning the flagged slide comprises:
   selecting the at least one imaging device from a plurality of imaging devices based on the plurality of imaging device configuration parameters; and
   scanning, at the selected imaging device, each flagged slide using the at least one scanning profile.

11. A method of digitalizing a slide, wherein the method comprises:
   scanning, using at least one imaging device, each slide of a plurality of slides, to generate an initial slide image and associated scanning metadata for each slide of the plurality of slides;
   determining, by a computing device, a quality control metric for each slide of the plurality of slides as a function of the initial slide image and the associated scanning metadata, wherein determining the quality control metric comprises:
      flagging the slide based on the determined quality control metric;
   generating, by the computing device, at least one scanning profile as a function of the scanning metadata based on the quality control metric; and
   re-scanning, at the at least one imaging device, the flagged slides within the plurality of slides at the imaging device using the at least one scanning profile.

12. The method of claim 11, further comprises:
   transferring, using a transfer component positioned between the at least one imaging device and at least one slide storage, each slide of the plurality of slides between the at least one slide storage and the at least one imaging device.

13. The method of claim 11, wherein generating the initial slide image and associated scanning metadata for each slide of the plurality of slides comprises:
   imaging, using the at least one imaging device, each slide of the plurality of slides based on a default scanning profile.

14. The method of claim 11, wherein flagging the slide comprises:
   classifying, by the computing device, the initial slide image and the associated scanning metadata into a scanning state using a slide image classifier; and
   flagging, by the computing device, the slide as a function of the scanning state.

15. The method of claim 11, wherein determining the quality control metric comprises:
   generating, by the computing device, quality control metadata as a function of the quality control metric; and
   modifying, by the computing device, the quality control metadata as a function of a user input received from a user.

16. The method of claim 11, wherein generating the at least one scanning profile comprises:
   identifying, by the computing device, at least one missed element from the initial slide image of the flagged slide as a function of the quality control metric;
   selecting, by the computing device, a plurality of scanning parameters configured to address the at least one missed element; and
   generating, by the computing device, the at least one scanning profile as a function of the plurality of scanning parameters.

17. The method of claim 16, wherein the plurality of scanning parameters comprises a plurality of imaging device configuration parameters.

18. The method of claim 16, wherein selecting the plurality of scanning parameters comprises:
   training, by the computing device, a scanning parameter selection model using scanning parameter training data, wherein the scanning parameter training data comprises a plurality of missed elements as input correlated to a plurality of scanning parameter sets as output; and
   selecting, by the computing device, the plurality of scanning parameters as a function of the at least one missed element using the trained scanning parameter selection model.

19. The method of claim 16, wherein re-scanning the flagged slide comprises:
   scanning, at the at least one imaging device, the identified missed element using the at least one scanning profile to generate a slide image shard of the flagged slide; and
   generating, by the computing device, a subsequent slide image for each flagged slide using the at least one scanning profile by merging the initial slide image and the slide image shard of the flagged slide.

20. The system of claim 17, wherein re-scanning the flagged slide comprises:
   selecting, by the computing device, the at least one imaging device from a plurality of imaging devices based on the plurality of imaging device configuration parameters; and
   scanning, at the selected imaging device, each flagged slide using the at least one scanning profile.

* * * * *